(12) United States Patent
Mikami et al.

(10) Patent No.: US 8,321,692 B2
(45) Date of Patent: Nov. 27, 2012

(54) INFORMATION PROCESSING APPARATUS, INFORMATION PROCESSING APPARATUS CONTROL METHOD, AND STORAGE MEDIUM

(75) Inventors: Fumio Mikami, Chigasaki (JP); Shozo Yamasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 12/642,730

(22) Filed: Dec. 18, 2009

(65) Prior Publication Data

US 2010/0165806 A1 Jul. 1, 2010

(30) Foreign Application Priority Data

Dec. 26, 2008 (JP) ................. 2008-331676

(51) Int. Cl.
G06F 1/32 (2006.01)
G06F 1/26 (2006.01)

(52) U.S. Cl. ........ 713/300; 713/310; 713/320; 713/321; 713/322; 713/323; 713/324; 713/330; 713/340; 711/6; 711/114

(58) Field of Classification Search .................. 713/300, 713/310, 320–324, 330, 340; 711/6, 114
See application file for complete search history.

(56) References Cited

U.S. PATENT DOCUMENTS

| 6,859,882 | B2 * | 2/2005 | Fung ............................. 713/300 |
| 2005/0210304 | A1 * | 9/2005 | Hartung et al. ................ 713/320 |
| 2007/0208921 | A1 | 9/2007 | Hosouchi et al. |
| 2009/0024857 | A1 * | 1/2009 | Akelbein et al. .............. 713/320 |
| 2010/0027147 | A1 * | 2/2010 | Subramanian et al. ......... 360/15 |
| 2010/0115310 | A1 * | 5/2010 | Kubota et al. ................. 713/320 |

FOREIGN PATENT DOCUMENTS

JP 2003-140839 A 5/2003

* cited by examiner

*Primary Examiner* — M Elamin
(74) *Attorney, Agent, or Firm* — Canon USA Inc IP Division

(57) ABSTRACT

An information processing apparatus includes a plurality of storage units, a mirroring control unit configured to execute mirroring processing, which includes writing processing for writing same data on each of the plurality of storage units and reading processing for reading data from either one of the plurality of storage units, and a power control unit configured to independently control supply of power to the plurality of storage units. If the supply of power to the plurality of storage units is reduced, if the mirroring control unit starts the writing processing, the information processing apparatus resumes the power supply to the plurality of storage units, and if the mirroring control unit starts the reading processing, the information processing apparatus resumes the power supply to a specific storage unit from which the data is read, and configured to execute control not to resume the power supply to the other storage unit(s).

9 Claims, 15 Drawing Sheets

INFORMATION PROCESSING APPARATUS, INFORMATION PROCESSING APPARATUS CONTROL METHOD, AND STORAGE MEDIUM

BACKGROUND OF THE INVENTION

1. Field of the Invention

The present invention relates to an information processing apparatus, an information processing apparatus control method, and a storage medium.

2. Description of the Related Art

Japanese Patent Application Laid-Open No. 2003-140839 discusses a "mirroring" data storage method, which stores the same data on a plurality of hard disks to prevent a system failure if one of the plurality of hard disks has gone out of order. However, if a plurality of hard disks is continuously in operation to secure the reliability of the hard disk, although the reliability of the hard disk can be secured, the power consumption may increase.

SUMMARY OF THE INVENTION

The present invention is directed to an information processing apparatus and an information processing apparatus control method configured, if power is yet to be supplied to a plurality of storage units, to appropriately control resumption of power supply to the plurality of storage units according to processing to be started thereafter, and capable of reducing the power consumption compared with a method in which power is continuously supplied to a plurality of storage units.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
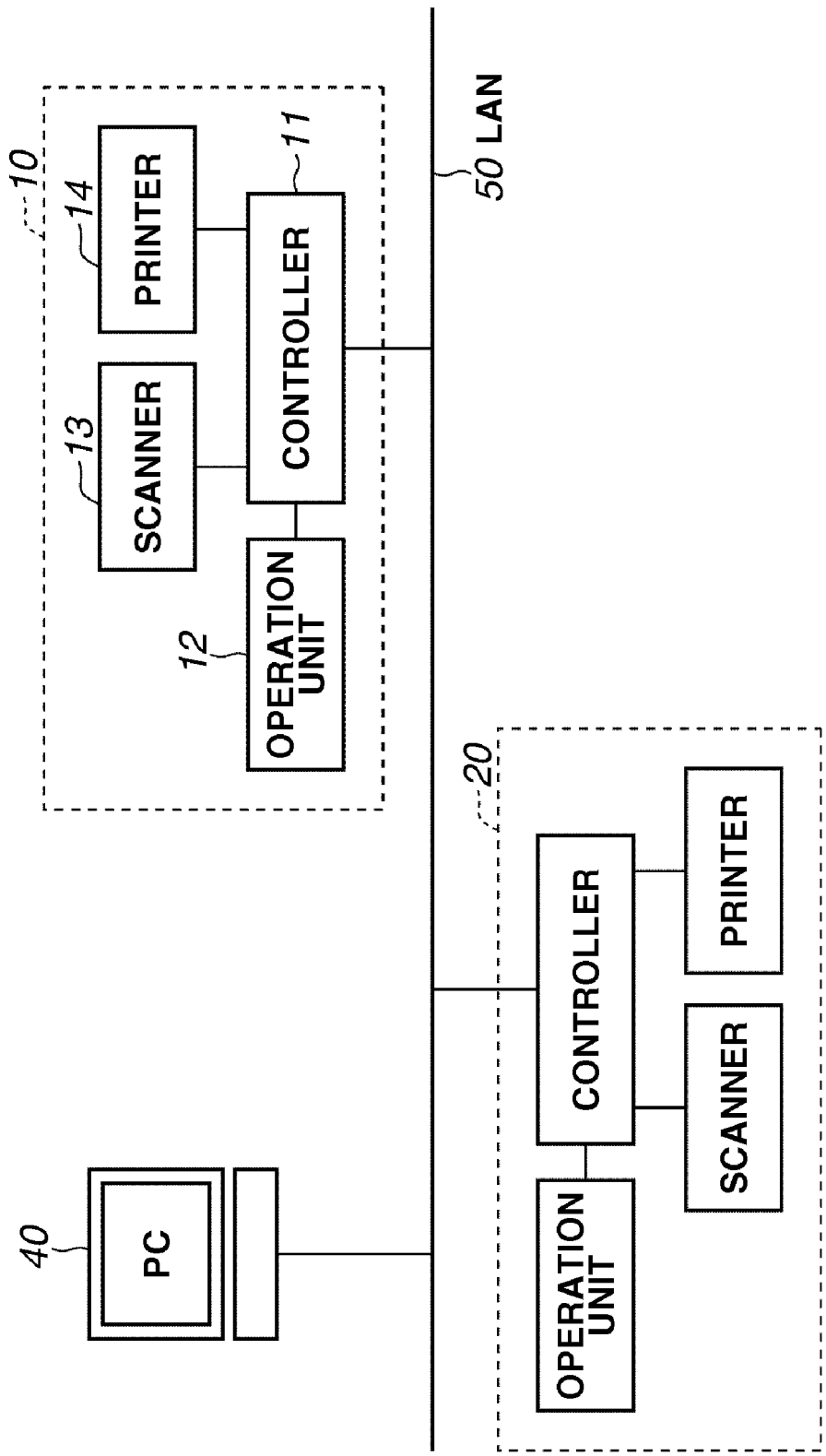
FIG. 1 illustrates an exemplary configuration of a printing system according to a first exemplary embodiment of the present invention.

A first exemplary embodiment of the present invention will be described below with reference to the drawings. FIG. 1 is a block diagram illustrating an exemplary configuration of a printing system to which an information processing apparatus according to the first exemplary embodiment of the present invention can be applied.

Referring to FIG. 1, the printing system includes a host computer 40 and two image forming apparatuses 10 and 20, which are in communication with one another via a local area network (LAN) 50. However, the number of image forming apparatuses included in the printing system is not limited to two. Furthermore, in the present exemplary embodiment, the data communication is executed via a LAN. However, the present exemplary embodiment is not limited to this type of data communication.

The host computer (hereinafter simply referred to as a "personal computer (PC)") 40 has a function of a general-purpose PC. The PC 40 can transmit and receive a file via the LAN 50 by using a file transfer protocol (FTP) or a server message block (SMB) protocol. Furthermore, the PC 40 can transmit and receive an e-mail via the LAN 50. In addition, the PC 40 can transmit a printing command to information processing apparatuses 10 and 20 via a printer driver.

The information processing apparatuses 10 and 20 have the same configuration. For easier understanding, the information processing apparatus 10 will be described in detail below as a typical apparatus of the two information processing apparatuses 10 and 20.

The image forming apparatus 10 includes a scanner unit (image input device) 13, a printer unit (image output device) 14, a controller 11, and an operation unit (user interface (UI)) 12. The components of the image forming apparatus 10 will be described in detail below.

An exemplary configuration of the information processing apparatuses 10 and 20 will be described in detail below. As described above, the information processing apparatuses 10 and 20 have the same configuration and the image forming apparatus 10 will be described in detail as a typical apparatus of the two. As illustrated in FIG. 1, the image forming apparatus 10 includes the scanner unit 13, the printer unit 14, the controller 11, and the operation unit 12.

Figure 2:
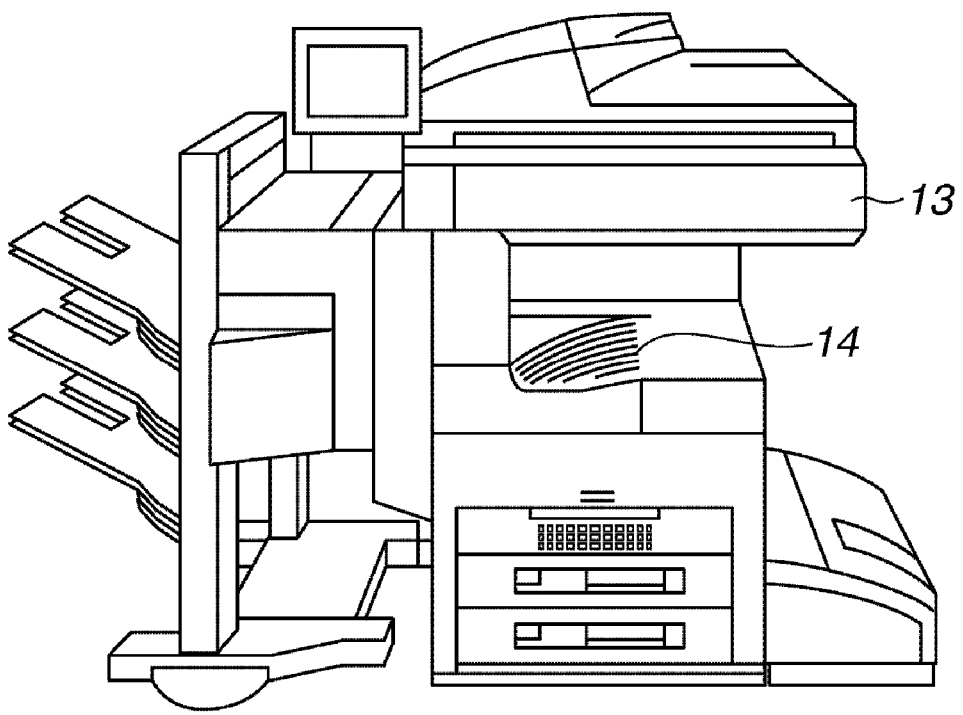
FIG. 2 illustrates an exemplary external appearance of an image forming apparatus according to an exemplary embodiment of the present invention.

FIG. 2 illustrates an exemplary external appearance of the image forming apparatus 10. Referring to FIG. 2, the scanner unit 13 converts image information into an electronic signal by inputting reflection light obtained by exposing and scanning an image of a document into an image sensor such as a charge-coupled device (CCD).

Furthermore, the scanner unit 13 converts the electric signal into luminance signals of R, G, and B colors and outputs the luminance signals to the controller 11 as image data. When a user of the image forming apparatus 10 gives an instruction for starting image reading processing via the operation unit 12, the controller 11 instructs the scanner unit 13 to start reading an image of the document. After receiving the instruction from the controller 11, the scanner unit 13 starts reading an image of the document. The printer unit 14 is an image forming device that forms an image on a printing sheet based on the image data received from the controller 11.

Figure 3:
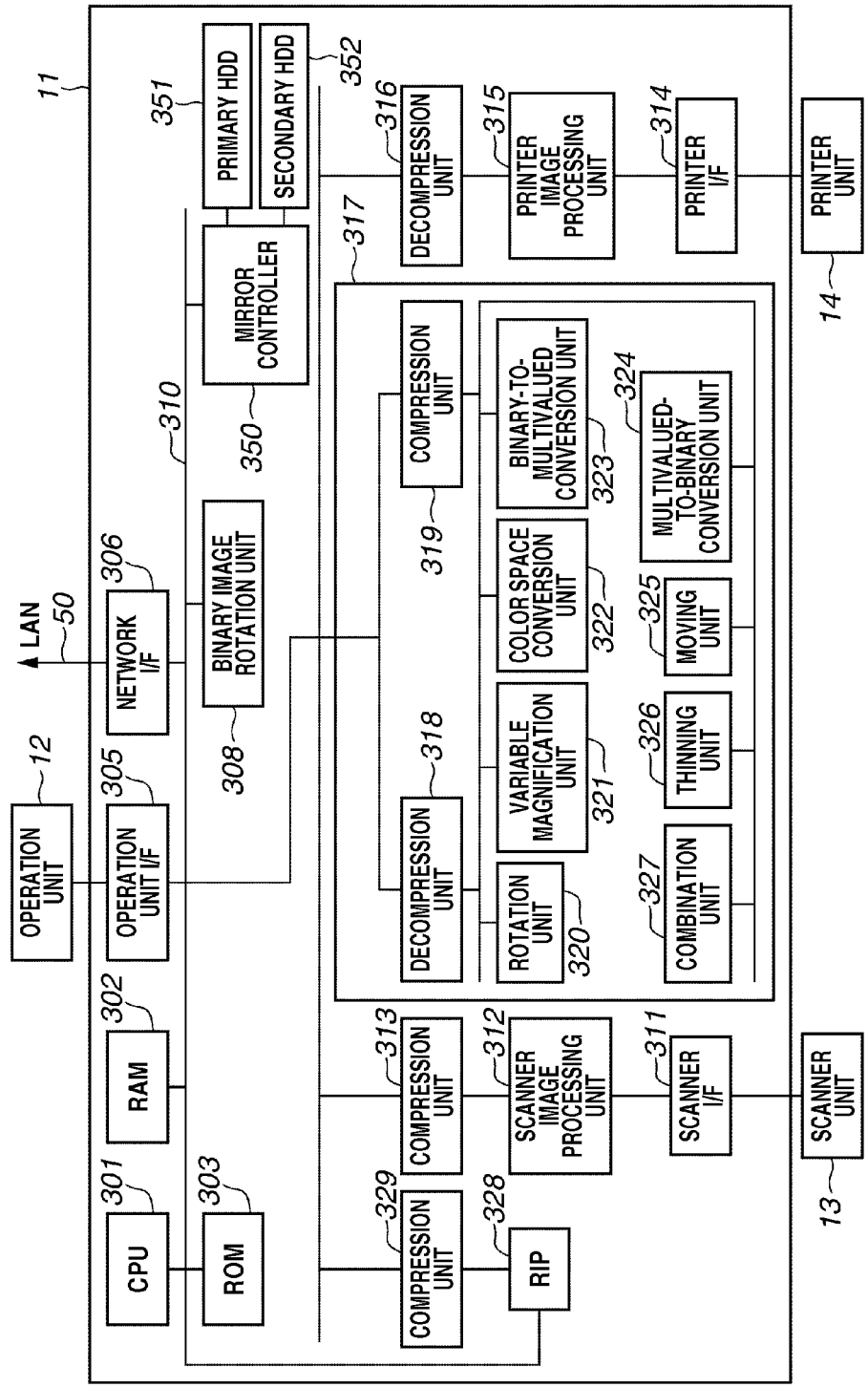
FIG. 3 is a block diagram illustrating an exemplary configuration of a controller of an image forming apparatus according to an exemplary embodiment of the present invention.

FIG. 3 is a block diagram illustrating an exemplary configuration of the controller 11 of the image forming apparatus 10. Referring to FIG. 3, the controller 11 is electrically connected to the scanner unit 13 and the printer unit 14. Furthermore, the controller 11 is connected to the PC 40 and an external apparatus via the LAN 50. Accordingly, image data and device information can be input and output between the image forming apparatus 10 and the PC 40 or an external apparatus via the LAN 50.

A central processing unit (CPU) 301 controls all accesses to various devices connected to the image forming apparatus 10 according to a control program stored on a read-only memory (ROM) 303. In addition, the CPU 301 controls the entire operation of controller 11 executed to perform various processing.

A random access memory (RAM) 302 functions as a system work memory for the CPU 301. The RAM 302 also functions as a temporary storage memory for temporarily storing image data. The RAM 302 includes a static random access memory (SRAM) and a dynamic random access memory (DRAM). The SRAM maintains a content stored thereon after the image forming apparatus 10 is powered off, and the DRAM erases a stored content after the image forming apparatus 10 is powered off. The ROM 303 stores a boot program of the image forming apparatus 10.

A mirroring controller 350 executes control to perform hard disk mirroring processing (mirroring control). Hard disks 351 and 352 are connected to the mirroring controller 350. The hard disks 351 and 352 constitute a mirroring system of the present invention. The hard disks 351 and 352 can store system software and image data.

In executing mirroring processing, the mirroring controller 350 executes mirroring processing, which includes writing processing for writing the same data on each of the hard disks 351 and 352 and reading processing for reading data from either one of the hard disks 351 and 352 (in the present exemplary embodiment, from the hard disk 351).

An operation unit interface (I/F) 305 is an interface between a system bus 310 and the operation unit 12. The operation unit I/F 305 receives image data to be displayed on the operation unit 12 from the system bus 310 and outputs the received image data to the operation unit 12. In addition, the operation unit I/F 305 outputs information input via the operation unit 12 to the system bus 310.

A network I/F 306 is connected to the LAN 50 and the system bus 310. The network I/F 306 inputs and outputs information. An image bus 330 is a data transmission path for transmitting and receiving image data. The image bus 330 includes a peripheral component interconnect (PCI) bus.

A scanner image processing unit 312 executes image correction, various image processing, and image editing on the image data received from the scanner unit 13 via a scanner I/F 311. A compression unit 313 receives the image data from the scanner image processing unit 312 and compresses the image data by dividing the image data into a 32×32-pixel block.

An image conversion unit 317 executes image processing on the image data where necessary. A decompression unit 318 decompresses the compressed image data. The decompressed image data is subjected to image processing by a rotation unit 320, a magnification unit 321, a color space conversion unit 322, a binary-to-multivalued conversion unit 323, a multivalued-to-binary conversion unit 324, a moving unit 325, a thinning unit 326, and a combination unit 327 where necessary. The processed image data is compressed again by a compression unit 319.

A decompression unit 316 decompresses the compressed image data to rasterize the image data into decompressed image data including a plurality of pieces of tile data. A printer image processing unit 315 processes the rasterized image data and transmits the image data to the printer unit 14 via a printer I/F 314.

Figure 4:
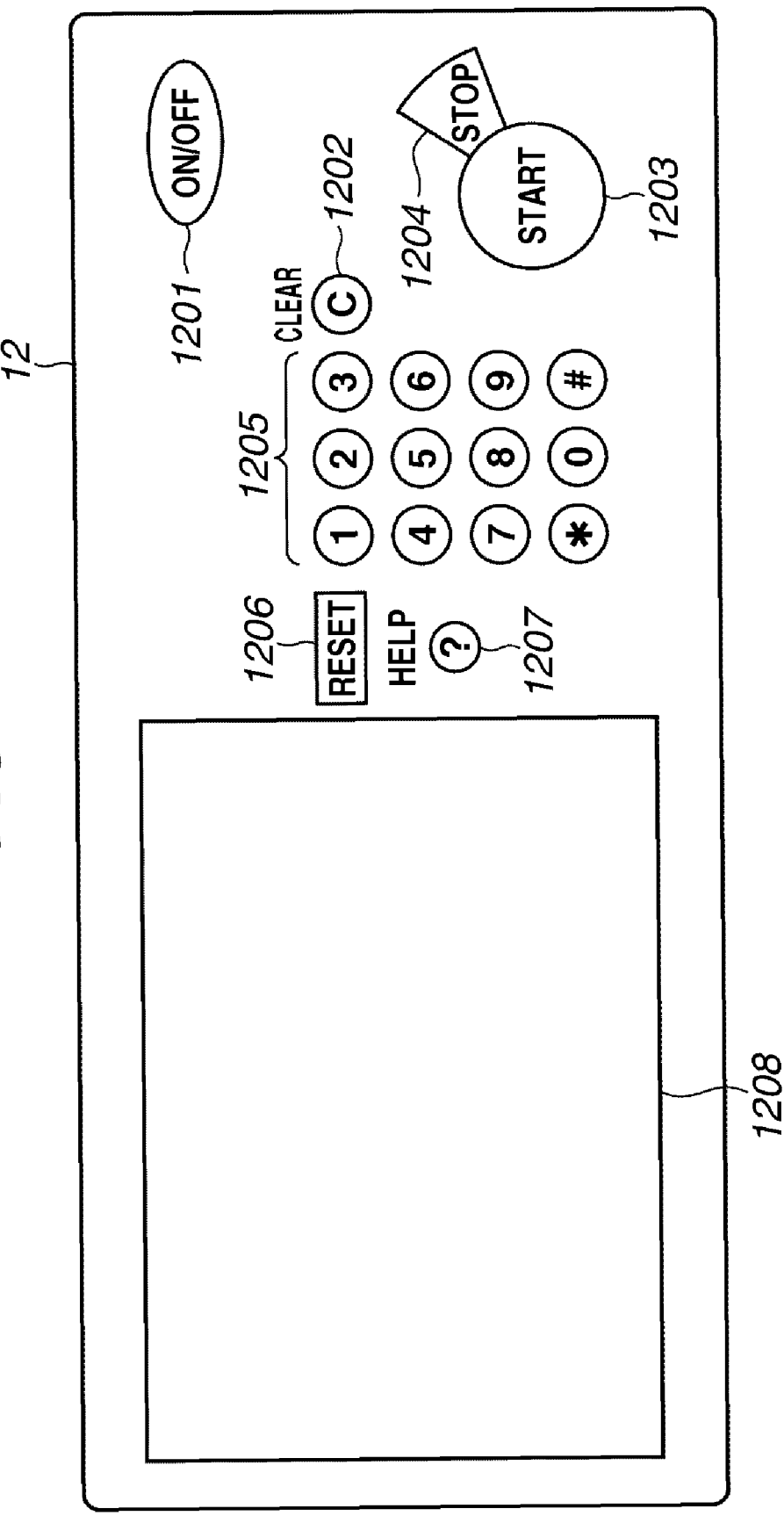
FIG. 4 illustrates an exemplary configuration of an operation unit according to an exemplary embodiment of the present invention.

FIG. 4 illustrates an exemplary configuration of the operation unit 12. Referring to FIG. 4, a soft power switch 1201 can be operated to give an instruction for setting the image forming apparatus 10 to a standby state or return the image forming apparatus 10 from the standby state.

An LCD display unit 1208 includes a touch panel sheet attached on the LCD. The LCD display unit 1208 displays a system operation screen. In addition, when a user of the image forming apparatus 10 presses a key displayed thereon, the LCD display unit 1208 transmits positional information about the pressed key to the controller 11.

Numeral keys 1205 can be operated to enter a numerical value of a setting item such as a number of copies. A "clear" key 1202 can be operated to clear an input numerical value. A "start" key 1203 can be operated to give an instruction for starting an operation for reading an image of a document. A "stop" key 1204 can be operated to stop the currently executed operation.

A "reset" key 1206 can be operated to reset a setting set via the operation unit 12. If the user does not know the function corresponding to a specific key, the user can press a "help" key 1207 to display guidance information about the function corresponding to the key.

Figure 5:
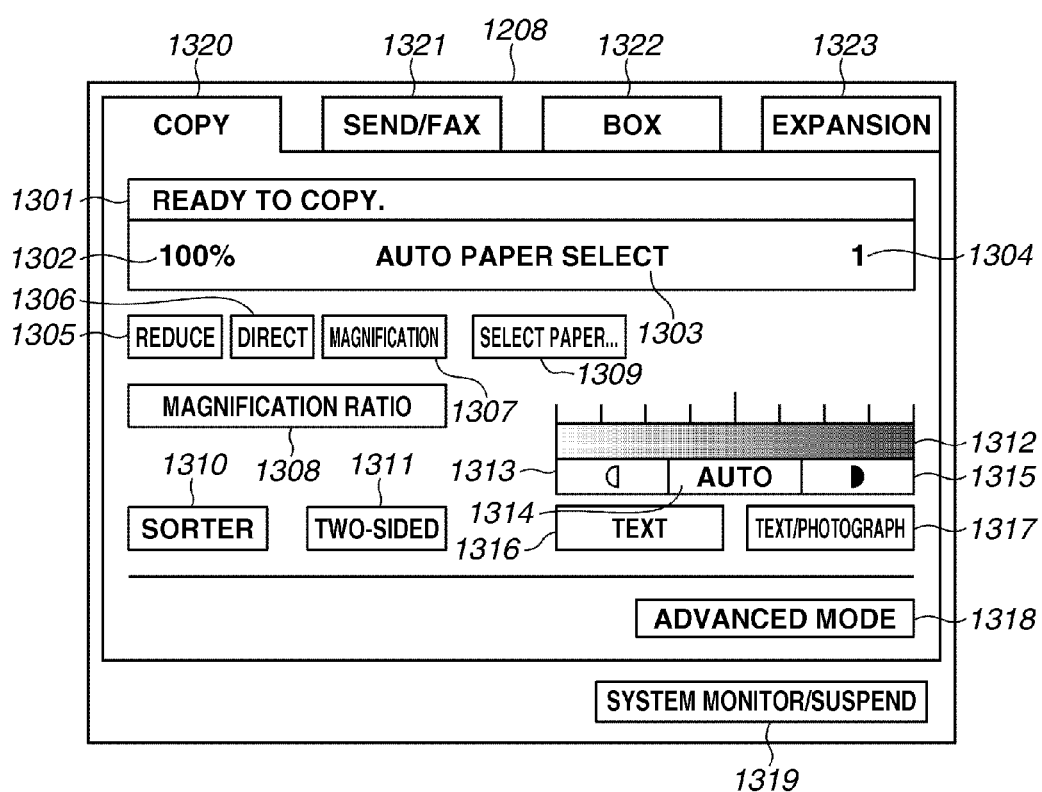
FIG. 5 illustrates an example of a copy operation screen displayed on a liquid crystal display (LCD) display unit illustrated in FIG. 4.

FIG. 5 illustrates an example of a copy operation screen displayed on the LCD display unit 1208 (FIG. 4). When the image forming apparatus 10 according to the present exemplary embodiment is powered on, the copy operation screen illustrated in FIG. 5 is displayed on the LCD display unit 1208 as a default screen.

Referring to FIG. 5, the LCD display unit 1208 includes a copy mode key 1320, which can be operated to perform a setting of a copy job. A SEND/FAX key 1321 can be operated to perform a setting of a send job for transmitting a scanned image by e-mail or by facsimile.

A box key 1322 can be operated to execute a box function, which will be described in detail below. An expansion key 1323 can be operated to execute an expansion function such as a remote scan function.

A messaging line field 1301 displays a message to notify the user of the state of the copy job. A magnification ratio field 1302 displays a magnification ratio, which is automatically determined based on a set magnification ratio and the set copy mode as a percent.

A paper size field 1303 displays a selected output paper. If an auto paper select mode has been set the paper size field 1303 displays a message "auto paper select".

A number-of-copies field 1304 displays the number of copies to make. A "reduce" key 1305 can be operated to execute a reduction copy operation. A "direct" key 1306 can be operated to reset the reduction or magnification copy setting to the direct copy setting. A "magnification" key 1307 can be operated to execute a magnification copy operation.

A magnification ratio key 1308 can be operated to set the magnification ratio at a specific exact value to execute reduction or magnification copy. A "paper select" key 1309 can be operated to designate an output paper. A "sorter" key 1310 can be operated to perform a setting of a processing mode such as sorting or stapling.

A two-sided key 1311 can be operated to perform a setting of a two-sided copy mode. A density field 1312 displays a currently set density level. As the density level displayed in the density field 1312 goes rightward, the density level increases. The density field 1312 changes the display of the density level according to the density setting set by pressing a "reduce density" key 1313, or an "increase density" key 1315.

The user can press the "reduce density" key 1313 and the "increase density" key 1315 to reduce and increase the density, respectively. An "auto" key 1314 can be operated to set a mode for automatically determining the density.

A "text" key 1316 can be operated to set a text mode, which is a mode for automatically setting the density level appropriate for copying a text document. A "text/photograph" key 1317 can be operated to set a text/photograph mode, which is a mode for automatically setting the density level appropriate for copying a document mixing a text area and a photograph area.

An "advanced mode" key 1318 can be operated to set various advanced copy modes, which cannot be set via a default copy screen. A "system monitor/suspend" key 1319 can be operated to confirm various functions of the image forming apparatus 10 and a job status. More specifically, the user can press the "system monitor/suspend" key 1319 to perform a job setting or suspend a currently executed job.

The "system monitor/suspend" key 1319 is always displayed at the location illustrated in FIG. 5. The "system monitor/suspend" key is displayed not only on the copy default screen but also on other screens. The user can confirm the system status by pressing the "system monitor/suspend" key 1319.

Now, a copy operation will be described in detail below with reference to FIGS. 2, 3, and 5.

Before starting a copy operation, the user places a document on a document plate of the scanner unit 13. Then, the user performs a copy setting via the copy operation screen (FIG. 5) via the operation unit 12. When the user presses the "start" key 1203, the scanner unit 13 starts reading an image of the document.

The document read by the scanner unit 13 is transmitted to the scanner image processing unit 312 via the scanner I/F 311 as image data. The scanner image processing unit 312 executes image correction, various image processing, and image editing on the image data.

The compression unit 313 divides the image data into 32×32-pixel blocks and generates tile data. Furthermore, the compression unit 313 compresses the image data including a plurality of pieces of tile data. The image data compressed by the compression unit 313 is then transmitted to the RAM 302 and stored thereon.

The image data is then transmitted to the image conversion unit 317 where necessary. In this case, the image conversion unit 317 executes necessary image processing on the image data. Then, the image data is transmitted to the RAM 302 again and stored thereon.

After that, the image data is read from the RAM 302 to be written on the hard disks 351 and 352. More specifically, at this timing, the image data is written on the primary hard disk 351 and the secondary hard disk 352 via the mirroring controller 350.

Then, the data is read from the hard disk 351 via the mirroring controller 350. More specifically, the mirroring controller 350 reads the data from the hard disk 351 and transmits the read image data to the system bus 310. Then, the image data is transmitted from the system bus 310 to the decompression unit 316.

The decompression unit 316 decompresses the image data. In addition, the decompression unit 316 rasterizes the decompressed image data including a plurality of pieces of tile data. The rasterized image data is transmitted to the printer image processing unit 315.

The image data processed by the printer image processing unit 315 is transmitted to the printer unit 14 via the printer I/F 314. As described above, in the present exemplary embodiment, the image data is written on the hard disks 351 and 352 before being read from the hard disk 351 because the present exemplary embodiment supposes that a work area is necessary to execute page arranging processing.

Figure 6:
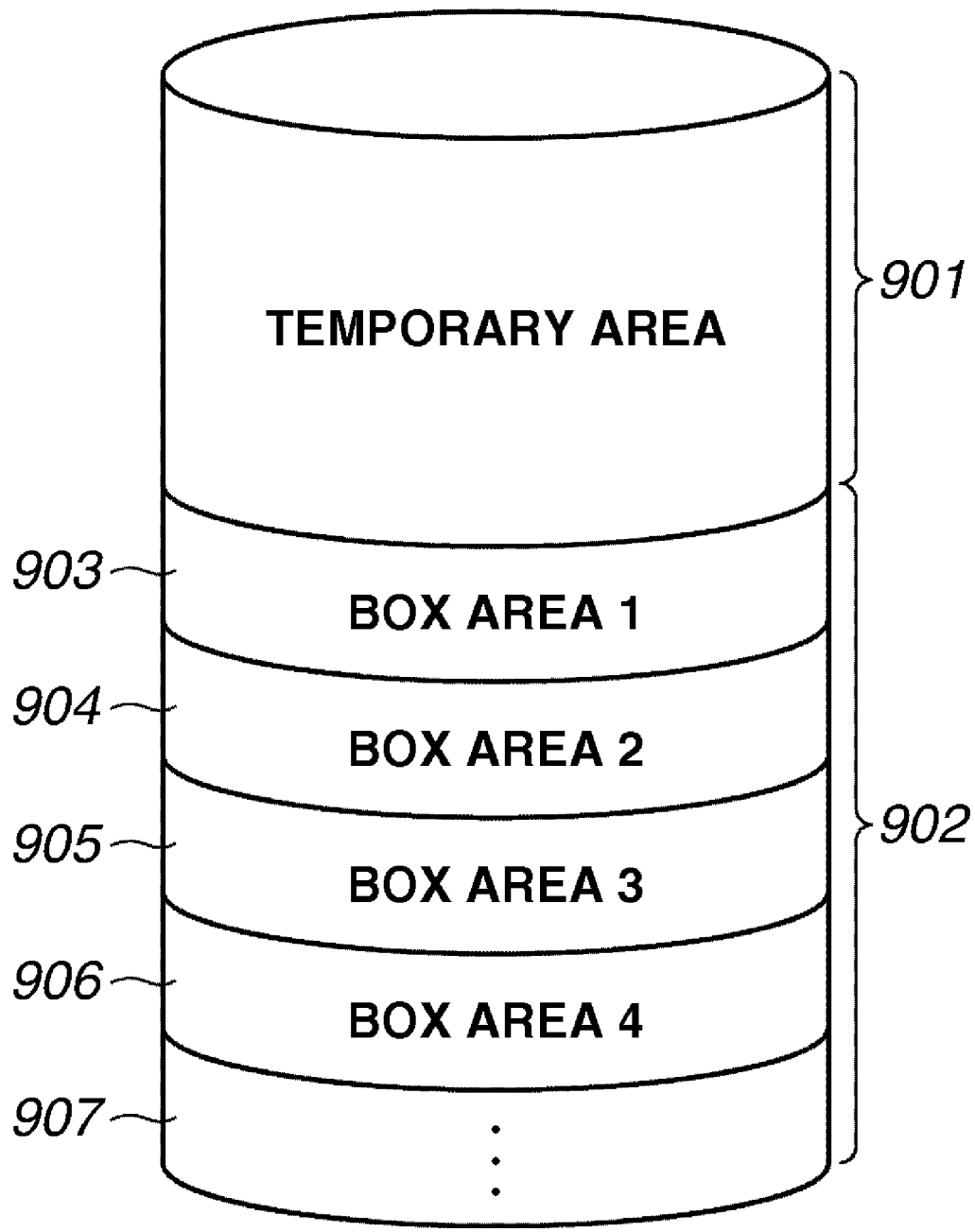
FIG. 6 illustrates an example of a method of logically using a hard disk according to an exemplary embodiment of the present invention.

FIG. 6 illustrates an example of a method of using the hard disk as a logical storage area. Referring to FIG. 6, in the present exemplary embodiment, a storage area of the hard disk is logically divided into a temporary storage area 901 and a box area 902 according to the purpose of use of the hard disk.

The temporary storage area 901 is a storage area for temporarily storing rasterized page description language (PDL) data or the image data from the scanner so that the order of outputting image data can be changed and that if a plurality of copies is to be output, the plurality of copies can be output by one scanning operation.

The box area 902 is a storage area used in executing the box function. The box area 902 is divided into a registered number of small storage areas (hereinafter simply referred to as a "box") 903 through 907.

In the present exemplary embodiment, a "box function" refers to a function, in printing and outputting a confidential document, for transmitting an image from the PC 40 and the scanner unit 13 to a designated storage area of the hard disk of the image forming apparatus 10 and for outputting the image on a printing sheet according to a user instruction given via the operation unit 12 of the image forming apparatus 10.

Each of the boxes 903 through 907 is assigned to each section of a company or to each section member (individual user). A box name and a box password can be assigned to each box.

The user can designate a box and store a PDL job or a scan job in either of the boxes 903 through 907. In addition, the user can execute an operation for reading data and information from the box to view the data and information stored therein on the LCD display unit 1208 and output the read data on a printing sheet.

If the use of a box is restricted to a specific user by a box password, data and information cannot be read from the box unless a correct box password is input.

Figure 7:
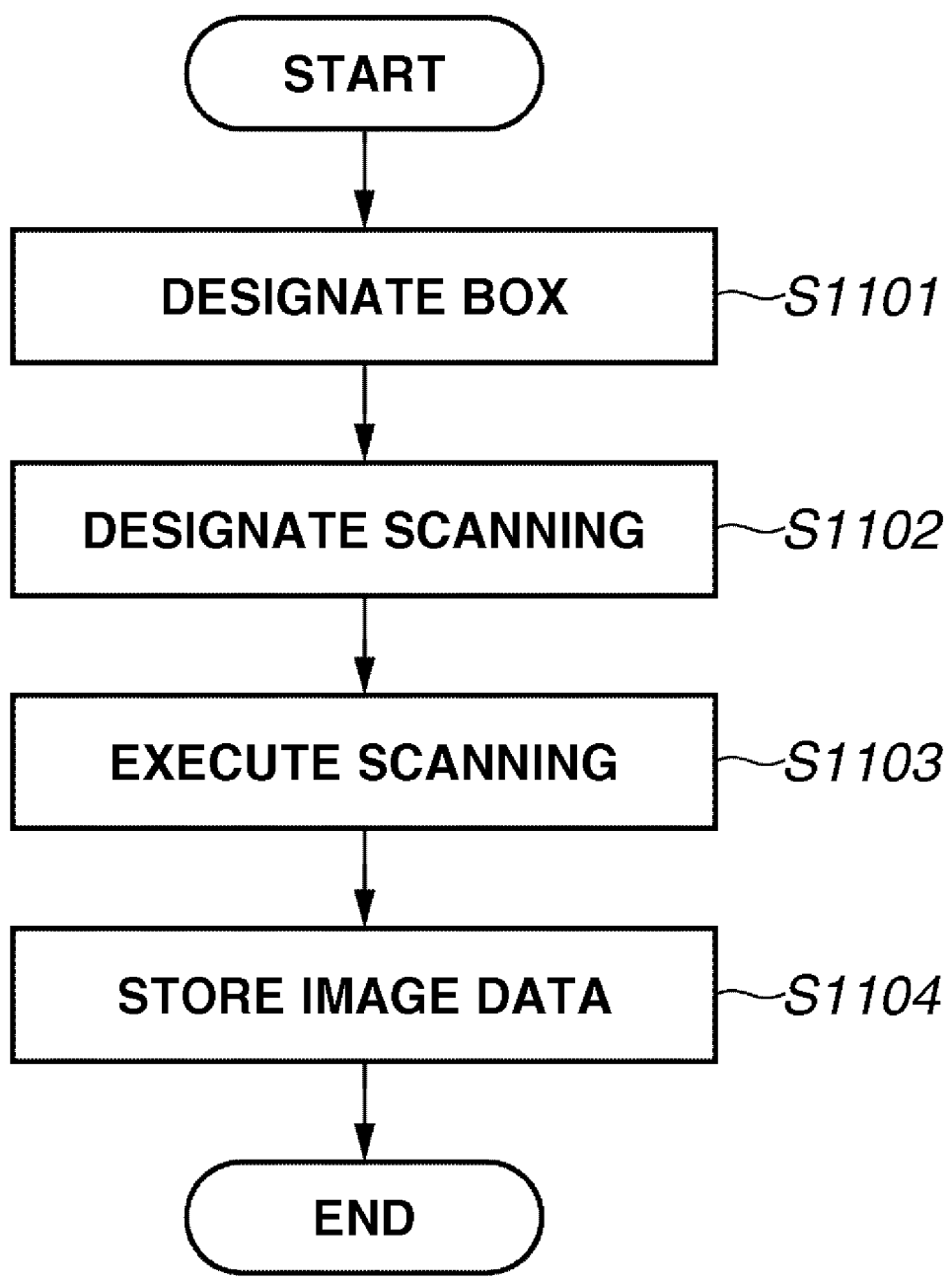
FIG. 7 is a flow chart illustrating exemplary flow of an operation for storing data in a box according to an exemplary embodiment of the present invention.

Now, processing for storing image data into a box according to the present exemplary embodiment will be described in detail below with reference to a flow chart illustrated in FIG. 7. FIG. 7 is a flow chart illustrating exemplary flow of processing for storing data in a box according to the present exemplary embodiment.

A method for storing image data from the scanner will be described in detail below with reference to FIG. 7 and FIG. 8 through FIG. 10.

Figure 8:
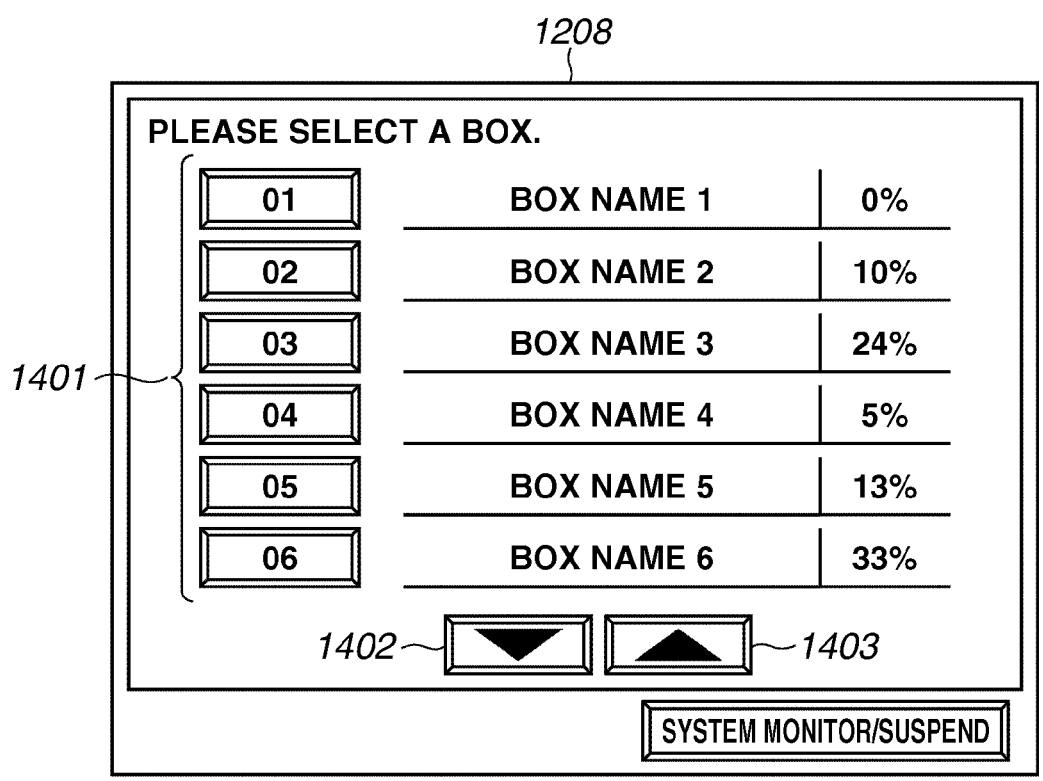
FIG. 8 illustrates an example of a box selection screen displayed on the LCD display unit according to an exemplary embodiment of the present invention.

FIG. 8 illustrates an example of a box selection screen displayed on the LCD display unit 1208 according to the present exemplary embodiment. When the user presses the box key 1322 displayed on the copy operation screen (FIG. 5), the CPU 301 displays the box selection screen illustrated in FIG. 8 on the LCD display unit 1208.

The user can call the box selection screen to select a box. The box selection screen includes a field 1401. The field 1401 displays a box number, a box name, and information about the capacity of the entire box area 902 in the hard disk used by each box, in percent figures.

Figure 9:
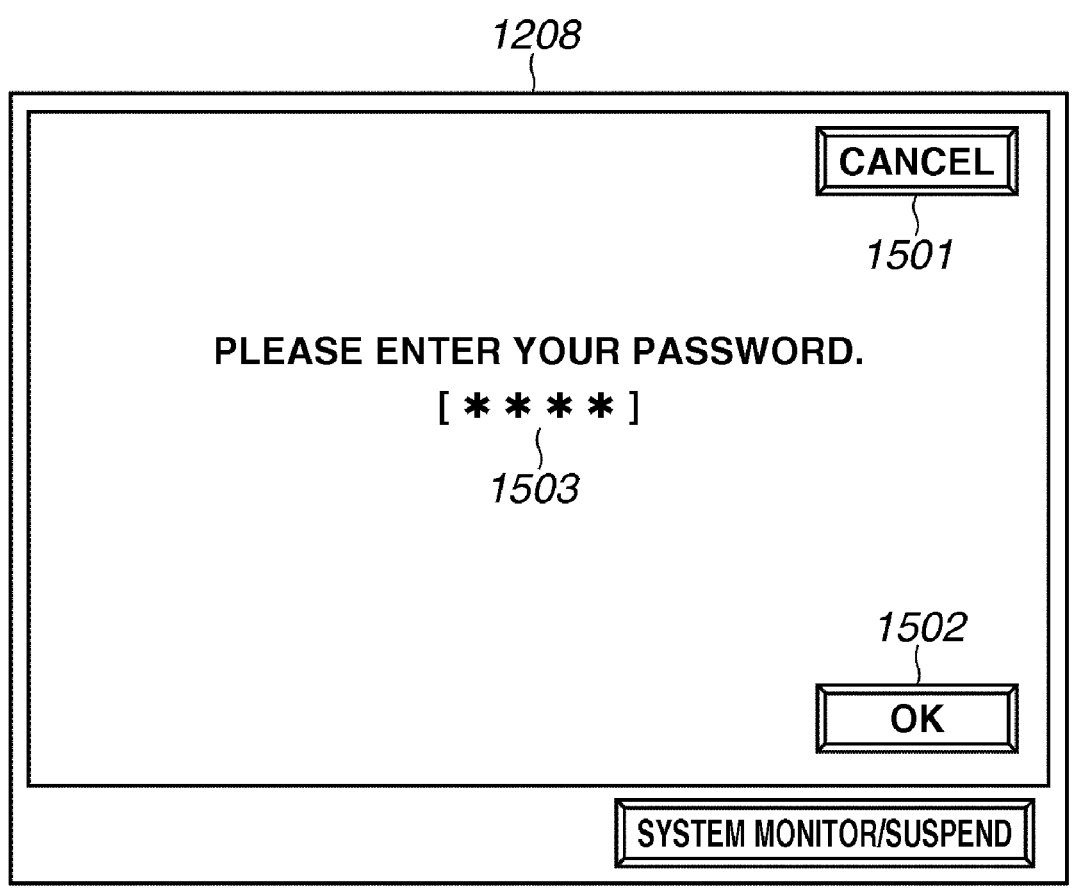
FIG. 9 illustrates an example of a box-password input screen displayed on the LCD display unit according to an exemplary embodiment of the present invention.

When the user presses a box number key in the field 1401, if a box password has been assigned to the selected box, then the CPU 301 changes the screen to a password input screen illustrated in FIG. 9. On the other hand, if no box password has been assigned to the selected box, then the CPU 301 changes the screen to a box content display screen illustrated in FIG. 10.

In the example illustrated in FIG. 8, downward and upward scroll keys 1402 and 1403 can be operated to scroll the screen if a number of boxes exceeding the maximum number of boxes that can be displayed within the field 1401 have been registered.

FIG. 9 illustrates an example of a box-password input screen displayed on the LCD display unit 1208 according to the present exemplary embodiment.

Referring to FIG. 9, a password display area 1503 displays the password entered by the user via the numeral keys 1205 (FIG. 8) in turned letters (in the present exemplary embodiment, asterisks are used instead of displaying the entered password itself).

A cancel key 1501 can be operated to cancel the entered password. If the cancel key 1501 is pressed, the screen shifts to the box selection screen illustrated in FIG. 8. An "OK" key 1502 can be operated to finally enter the input password. If the OK key 1502 is pressed after entering a password, the CPU 301 verifies the entered password (authorizes the user).

As described above, when the user enters the password set to each box via the via the password input screen, the screen is changed to the box content display screen. The user can access each box via the box content display screen. If a wrong password is entered, the screen shifts to a warning screen (not illustrated). In this case, the user who has entered a wrong password cannot access a box.

Figure 10:
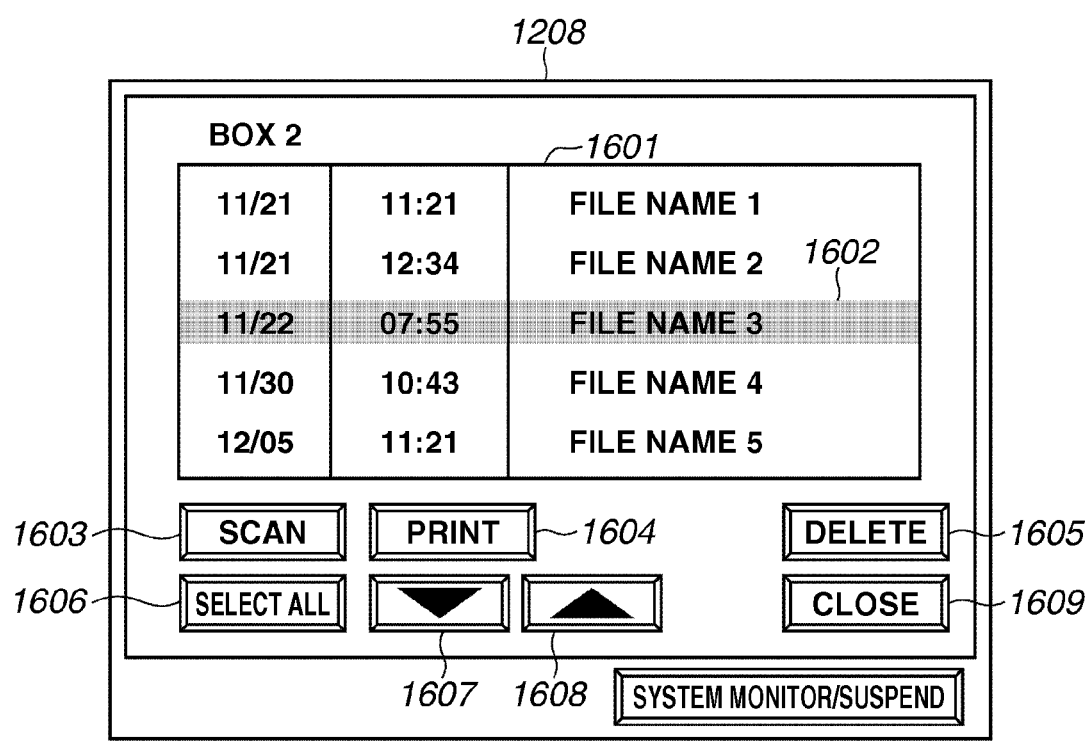
FIG. 10 illustrates an example of a box content display screen displayed on the LCD display unit according to an exemplary embodiment of the present invention.

FIG. 10 illustrates an example of a box content display screen displayed on the LCD display unit 1208 according to the present exemplary embodiment. Referring to FIG. 10, a list of files included in a box 1601 includes a list of date and time of registration and a file name of each files stored in the box. The user presses the file name to select a file from the file list 1601. If a file is selected, the selected file is displayed in a reversed state. In the example illustrated in FIG. 10, a file whose file name is "3" has been selected as indicated by a selected state 1602. In the present exemplary embodiment, a file can be operated in a toggle manner. More specifically, if the user presses the file name of the currently selected file again, the selected state is canceled.

A scan key 1603 can be operated to input an image into the currently opened box from the scanner. If the scan key 1603 is pressed, the screen shifts to a scan setting screen (not illustrated). A print key 1604 can be operated to print the file selected from the file list 1601. A delete key 1605 can be operated to delete a file selected from the file list 1601.

A "select all" key 1606 can be operated to select all the files displayed in the file list 1601.

Downward and upward scroll keys 1607 and 1608 can be operated to scroll the screen if a number of files exceeding the maximum number of files that can be displayed within the file list 1601 has been registered.

A "close" key 1609 can be operated to return to the password input screen (FIG. 9) or the box selection screen (FIG. 8).

Now, processing for storing data in a box according to the present exemplary embodiment will be described in detail below with reference to FIG. 7. In the example illustrated in FIG. 7, processing in steps S1101 through S1104 is implemented by the CPU 301 of the controller 11 of the image forming apparatus 10 by reading and executing a program from the ROM 303.

Referring to FIG. 7, in storing image data input from the scanner in a box, in step S1101, the CPU 301 of the controller 11 of the image forming apparatus 10 receives a designation of a box number of a box in which the image to be input via the box selection screen illustrated in FIG. 8. If a password has been set to the designated box, the CPU 301 displays the password input screen illustrated in FIG. 9 to allow the user to enter a password.

In step S1102, the CPU 301 of the controller 11 of the image forming apparatus 10 receives a designation of a scan setting such as image processing, which is input by pressing the scan key 1603 via the box content display screen illustrated in FIG. 10.

After the designation and setting in steps S1101 and S1102 are completed and if it is detected that the "start" key 1203 has been pressed by the user via the operation unit 12, then the processing advances to step S1103. The processing in steps S1101 and S1102 can be executed in a reversed order.

In step S1103, the CPU 301 of the controller 11 of the image processing apparatus 10 reads a document by using the scanner unit 13. Then, the processing advances to step S1104. In step S1104, the image data that the CPU 301 of the controller 11 of the image processing apparatus 10 executes processing for storing the image data read in step S1103.

More specifically, in step S1104, the CPU 301 transmits the image read in step S1103 from the scanner unit 13 (FIG. 3) to the scanner image processing unit 312 via the scanner I/F 311 as image data. The scanner image processing unit 312 executes image correction, various image processing, and image editing processing on the received image data.

In addition, the compression unit 313 divides the image data into 32×32-pixel blocks and generates tile data. Furthermore, the compression unit 313 compresses the image data including a plurality of pieces of tile data. The image data compressed by the compression unit 313 is transmitted to the RAM 302 to be stored thereon. The image data is then transmitted to the image conversion unit 317 where necessary. In this case, the image conversion unit 317 executes necessary image processing on the image data. Then, the image data is transmitted to the RAM 302 again and stored thereon.

After that, the image data read from the RAM 302 is stored in a box area, among the entire box area 902 of the hard disk, which corresponds to the box number designated in step S1101. The image data is written on (stored on) the primary hard disk 351 and the secondary hard disk 352 via the mirroring controller 350. After image data storage processing in step S1104 is completed, the CPU 301 of the controller 11 of the image forming apparatus 10 ends the processing illustrated in the flow chart of FIG. 7.

Now, an operation for calling (reading) data from a box will be described in detail below with reference to FIG. 11.

Figure 11:
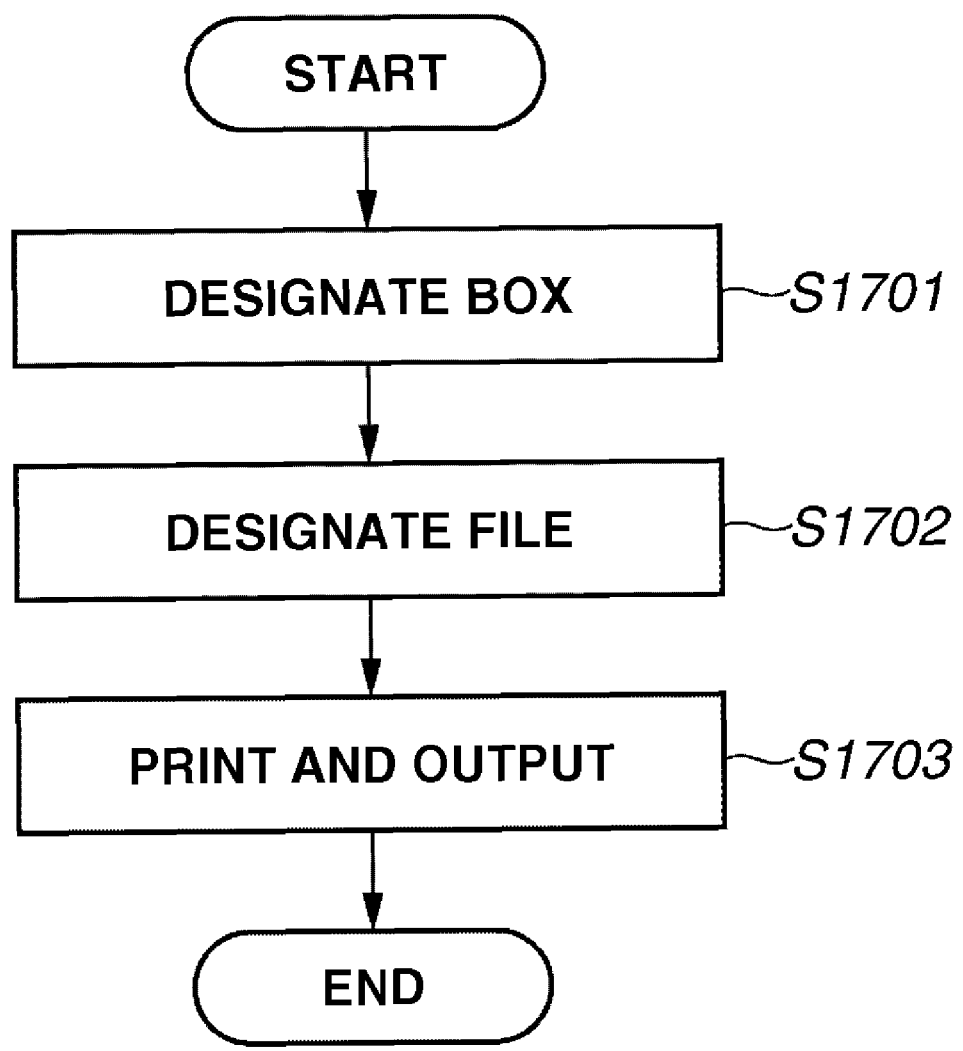
FIG. 11 is a flow chart illustrating an exemplary flow of processing for calling up data from a box executed by an image forming apparatus according to an exemplary embodiment of the present invention.

FIG. 11 is a flow chart illustrating an example of processing executed by the image forming apparatus 10 for calling data from a box. By executing the processing illustrated in FIG. 11, the user can designate and print a file from those included in a box.

In the example illustrated in FIG. 11, processing in steps S1701 through S1703 is implemented by the CPU 301 of the controller 11 of the image forming apparatus 10 by reading and executing a program from the ROM 303.

Referring to FIG. 11, in step S1701, the CPU 301 of the controller 11 of the image forming apparatus 10 receives a designation of a box number of a box in which the image is to be input via the box selection screen illustrated in FIG. 8. If a password has been set to the designated box, the CPU 301 displays the password input screen illustrated in FIG. 9 to allow the user to enter a password.

After the designation of the box number and the input of a correct password are detected, the processing advances to step S1702.

In step S1702, the CPU 301 of the controller 11 of the image processing apparatus 10 receives a selection of a file to be printed and output from the file list 1601 via the screen illustrated in FIG. 10.

After a file has been selected and if it is detected that the user has pressed the print key 1604 (FIG. 10), then the processing advances to step S1703.

In step S1703, the CPU 301 of the controller 11 of the image processing apparatus 10 prints and outputs the file selected in step S1702. More specifically, the CPU 301 of the controller 11 of the image processing apparatus 10 reads the file selected in step S1702 from the hard disk via the mirroring controller 350.

At this stage of processing, the mirroring controller 350 reads data from the primary hard disk 351 and transmits the read data to the system bus 310. Then, the image data is transmitted from the system bus 310 to the decompression unit 316. The decompression unit 316 decompresses the image data. In addition, the decompression unit 316 rasterizes the decompressed image data including a plurality of pieces of tile data.

The rasterized image data is transmitted to the printer image processing unit 315. The printer image processing unit 315 processes the image data. The image data processed by the printer image processing unit 315 is then printed and output by the printer unit 14 via the printer I/F 314.

After the printing/outputting processing in step S1703 is completed, the CPU 301 of the controller 11 of the image forming apparatus 10 ends the processing.

Figure 12:
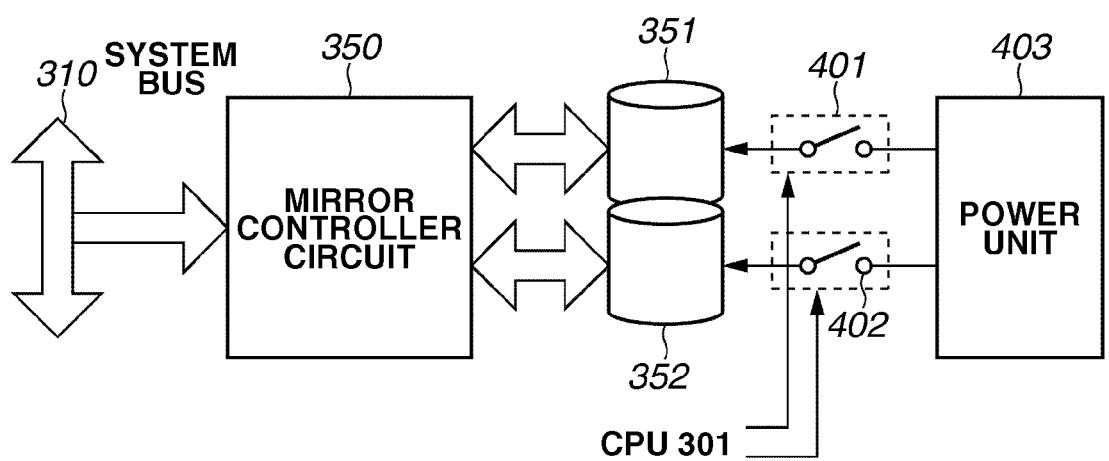
FIG. 12 is a block diagram illustrating an example of a mirroring controller and a hard disk according to an exemplary embodiment of the present invention.

FIG. 12 is a block diagram illustrating details of the mirroring controller 350 and the hard disks 351 and 352.

Referring to FIG. 12, power is supplied from a power unit 403 (power source) independently to each of the primary hard disk 351 and the secondary hard disk 352 via a switch 401 or 402. The switching of the switches 401 and 402 is controlled by the CPU 301 of the controller 11 of the image forming apparatus 10.

In the present exemplary embodiment, in a standby state, the CPU 301 of the controller 11 of the image forming apparatus 10 controls both of the switches 401 and 402 to be off. If it is necessary to read data from the hard disk, the CPU 301 of the controller 11 of the image forming apparatus 10 controls the switch 401 of the primary hard disk 351 to be on.

In executing a job for reading data from the hard disk, the CPU 301 reads data from the primary hard disk 351 (executes the above-described "operation for reading data from the box").

In executing and operation for writing onto the hard disk, such as the copy operation or the operation for storing data into a box, the CPU 301 of the controller 11 of the image forming apparatus 10 controls both of the above-described switches 401 and 402 of the hard disks 351 and 352 to be on.

As described above, the CPU 301 independently controls the supply of power to each of the hard disks 351 and 352 to restrict the power supply to each hard disk as necessary. Accordingly, the present exemplary embodiment can reduce the power consumption.

In addition, in the operation for storing data in a box and the copy operation, the CPU 301 does not supply power to the secondary hard disk 352 during an operation for reading data written on the hard disk. Accordingly, the present exemplary embodiment can further reduce the power consumption during the operations.

Now, control of power source (power supply) of the primary hard disk 351 and the secondary hard disk 352 during the operation for storing data in a box and the copy operation according to the exemplary embodiment of the present invention will be described in detail below with reference to a flow chart of FIG. 13.

Figure 13:
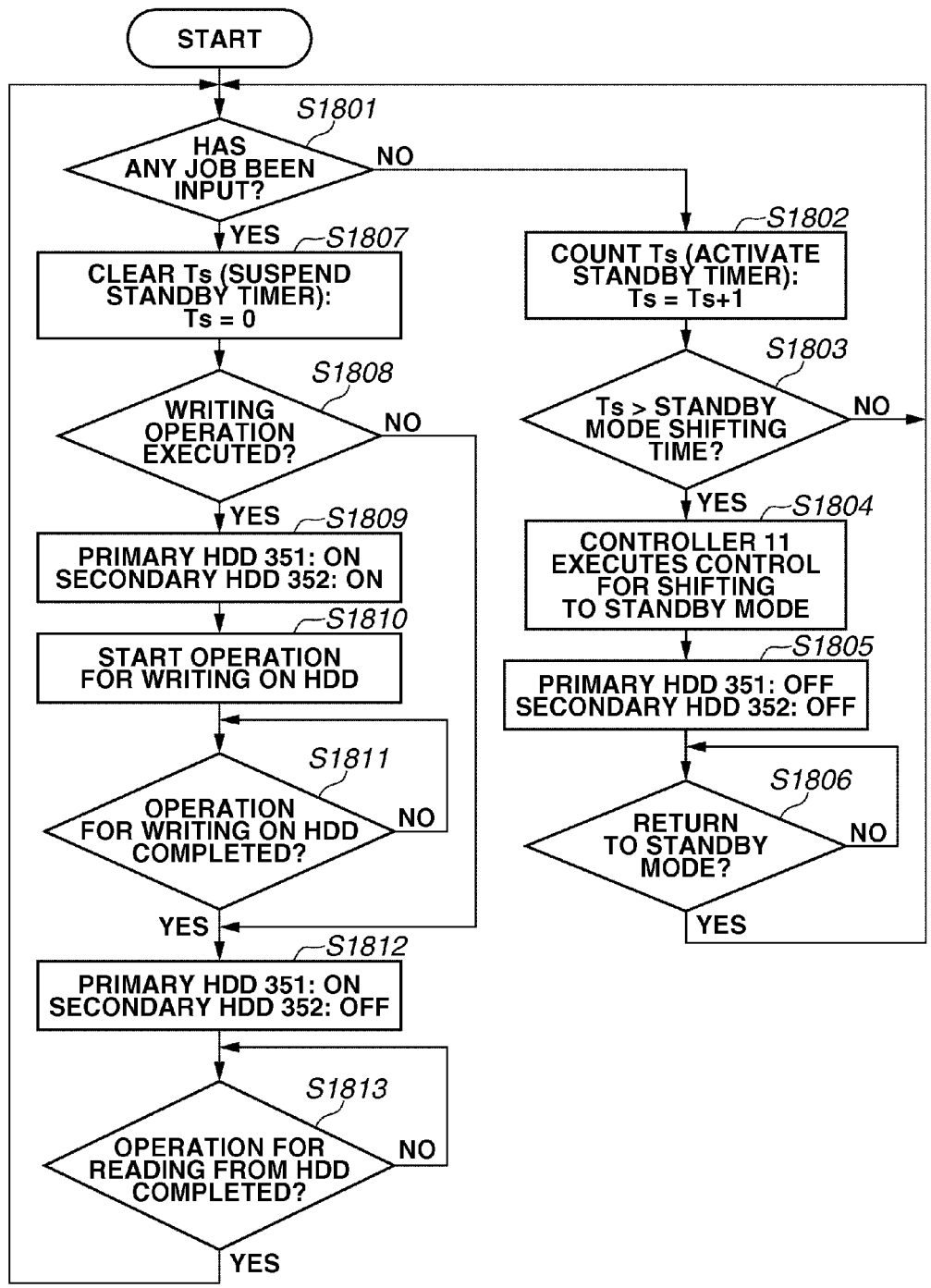
FIG. 13 is a flow chart illustrating exemplary flow of a power saving operation executed by an image forming apparatus according to the first exemplary embodiment of the present invention.

FIG. 13 is a flow chart illustrating exemplary flow of a power saving operation executed by the image forming apparatus 10 according to the present exemplary embodiment. In the example illustrated in FIG. 13, processing in steps S1801 through S1813 is implemented by the CPU 301 of the controller 11 of the image forming apparatus 10 by reading and executing a program from the ROM 303.

Referring to FIG. 13, in step S1801, the CPU 301 of the controller 11 of the image forming apparatus 10 determines whether a job has been input after the image forming apparatus 10 is powered on. If it is determined that no job has been input (NO in step S1801), then the processing advances to step S1802. In step S1802, the CPU 301 of the controller 11 of the image forming apparatus 10 activates a counter (Ts) for measuring time taken for shifting to the standby mode and increments Ts by 1 (Ts=Ts+1).

In step S1803, the CPU 301 of the controller 11 of the image processing apparatus 10 determines whether the counter value (Ts) has exceeded a predetermined standby mode-shifting time. If it is determined that the counter value (Ts) has not exceeded a predetermined standby mode-shifting time (NO in step S1803), then the processing returns to step S1801 and waits until a job is input and the counter value (Ts) exceeds the predetermined standby mode-sifting time.

On the other hand, if it is determined that the counter value (Ts) has exceeded a predetermined standby mode-shifting time (YES in step S1803), then the processing advances to step S1804.

In step S1804, the CPU 301 of the controller 11 of the image processing apparatus 10 changes the mode of the image forming apparatus 10 into the standby state. Then, the processing advances to step S1805.

In step S1805, the CPU 301 of the controller 11 of the image processing apparatus 10 releases (switches off) both of the above-described switches 401 and 402 and powers off both of the above-described hard disks 351 and 352. The controller 11 of the image processing apparatus 10 executes control to continue the standby state of the image forming apparatus 10 until the user presses the soft power switch 1201

(FIG. 8) or inputs a page description language (PDL) job from the PC 40 (NO in step S1806).

If it is determined that the image forming apparatus 10 is to return from the standby state (YES in step S1806), then the CPU 301 of the controller 11 of the image forming apparatus 10 returns to step S1801.

On the other hand, if it is determined that a job has been input (YES in step S1801), then the processing advances to step S1807. In step S1807, the CPU 301 of the controller 11 of the image forming apparatus 10 clears the counter (Ts). Then, the processing advances to step S1808.

In step S1808, the CPU 301 of the controller 11 of the image forming apparatus 10 determines whether the input job includes an operation for writing data on the hard disk. In the present exemplary embodiment, a "job including an operation for writing data on the hard disk" refers to the above-described "operation for storing data on a box" and "copy operation".

If it is determined that the input job does not include an operation for writing data on the hard disk (i.e., if it is determined that the input job is a job that includes an operation for reading data from the hard disk only) (NO in step S1808), then the processing advances to step S1812. In the present exemplary embodiment, an "operation for reading data from the hard disk only" is equivalent to an "operation for reading data from a box".

If a reading operation only is to be executed, it is determined "NO" (i.e., it is determined that the input job does not include an operation for writing data on the hard disk) in step S1808. In addition, if a reading operation only is to be executed, it is determined "YES" (i.e., it is determined that the operation for writing data on the hard disk has been completed) in step S1811. More specifically, these determination results are obtained if the operation state of the image forming apparatus 10 is in a "specific state", in which a specific hard disk (i.e., the primary hard disk 351) is used but the other hard disk (i.e., the secondary hard disk 352) is not used.

In step S1812, the CPU 301 of the controller 11 of the image processing apparatus 10 starts the reading operation, switches the power switch 401 ON, and powers on the primary hard disk 351.

In addition, the CPU 301 of the controller 11 of the image processing apparatus 10 switches the power switch 402 OFF, and powers off the secondary hard disk 352.

On the other hand, if it is determined that the input job includes the operation for writing data on the hard disk (YES in step S1808), then the processing advances to step S1809. In step S1809, the CPU 301 of the controller 11 of the image processing apparatus 10 switches both of the above-described switches 401 and 402 ON and powers on the hard disks 351 and 352.

In step S1810, the CPU 301 of the controller 11 of the image processing apparatus 10 starts a job writing operation.

In step S1811, the CPU 301 of the controller 11 of the image forming apparatus 10 waits until the operation for writing the data of the job on the hard disk is completed (determines whether the operation for writing the data of the job on the hard disk is completed). If it is determined that the operation for writing the data of the job on the hard disk is completed (YES in step S1811), then the processing advances to step S1812.

If a reading operation only is to be executed, it is determined "YES" (i.e., it is determined that the operation for writing data on the hard disk has been completed) in step S1811. More specifically, the determination result is obtained if the operation state of the image forming apparatus 10 is in a "specific state", in which a specific hard disk (i.e., the primary hard disk 351) is used but the other hard disk (i.e., the secondary hard disk 352) is not used.

In step S1812, the CPU 301 of the controller 11 of the image processing apparatus 10 switches off the power switch 402 only and powers off the secondary hard disk 352.

In step S1813, the CPU 301 of the controller 11 of the image forming apparatus 10 determines whether the operation for reading data from the hard disk is completed. If it is determined that the operation for reading data from the hard disk is completed (YES in step S1813), then the processing returns to step S1801 and determines whether a new job is input.

If it is determined that a new job has been input (YES in step S1801) and that the input job includes an operation for writing data on the hard disk (YES in step S1808), then the processing advances to step S1809 and resumes the power supply to the secondary hard disk 352.

More specifically, after the power supply to the secondary hard disk 352 has been discontinued in step S1812, if it is determined that a new job has been input in step S1801 and if it is determined that the input job includes a request to write data on both of the above-described hard disks 351 and 352 (YES in step S1808), then the CPU 301 resumes the power supply to the secondary hard disk 352 in step S1809.

As described above, in the above-described "operation for storing data in a box" and "copy operation", the present exemplary embodiment restricts the power supply to the hard disk that is not used during the reading operation. Accordingly, the present exemplary embodiment can save the power consumption of the image forming apparatus 10.

In particular, in printing a large number of copies, the present exemplary embodiment can effectively reduce the power consumption. In printing a large number of copies, the time taken in the reading operation is far longer than that taken in the operation for writing data on the hard disk. More specifically, in printing one thousand copies, it is necessary to execute reading operations one thousand times for one job writing operation.

In a conventional method, the power supply to a hard disk that is not used in a reading operation is continued during an operation for printing a large number of copies. Accordingly, a conventional method operating in this way consumes a great amount of power during an operation for printing a large number of copies.

On the other hand, in an exemplary embodiment of the present invention, the power supply to the hard disk that is not used during the reading operation is discontinued. Accordingly, the present invention can effectively reduce the power consumption during printing a large number of copies.

In the present exemplary embodiment, in steps S1808 and 1810, if it is determined that the input job includes an operation for writing data on the hard disk (the operation for storing data in box" or "copy operation"), then the CPU 301 switches both of the above-described hard disks 351 and 352.

However, the present exemplary embodiment is not limited to this. More specifically, it is useful, if the input job includes the writing operation (i.e., an operation such as the operation for storing data in box) that requires mirroring, then the CPU 301 switches on both of the above-described hard disks 351 and 352. However, if the input job does not include a writing operation that requires mirroring but includes a writing operation that does not require mirroring, then the CPU 301 switches the primary hard disk 351 only.

In the power saving operation mode described above in the first exemplary embodiment, as illustrated in FIG. 13, after it is determined in step S1811 that the operation for writing data on the hard disk is completed, the CPU 301 powers off the secondary hard disk 352 in step S1812.

After a hard disk is powered on, it takes a predetermined resumption time until data stored on the hard disk can become accessible. A resumption time is defined as a spin up time, which is different for each hard disk product. It takes in general ten to thirty seconds for a resumption time.

Accordingly, if the time taken for the reading operation executed in step S1813 (FIG. 13) is short, then almost no time may be taken for the reading operation (or the reading operation has already been completed) after the secondary hard disk 352 is powered off. In this case, even when a new job is input, the image forming apparatus 10 cannot execute a writing operation before the hard disk is powered on again. Accordingly, although the power consumption can be reduced, the performance of the image forming apparatus 10 itself may degrade.

If it is determined that the time taken for the reading operation is short, then a second exemplary embodiment of the present invention executes control not for powering off the secondary hard disk 352. Accordingly, the present exemplary embodiment can reduce the above-described influence on the performance of the image forming apparatus 10.

Figure 14:
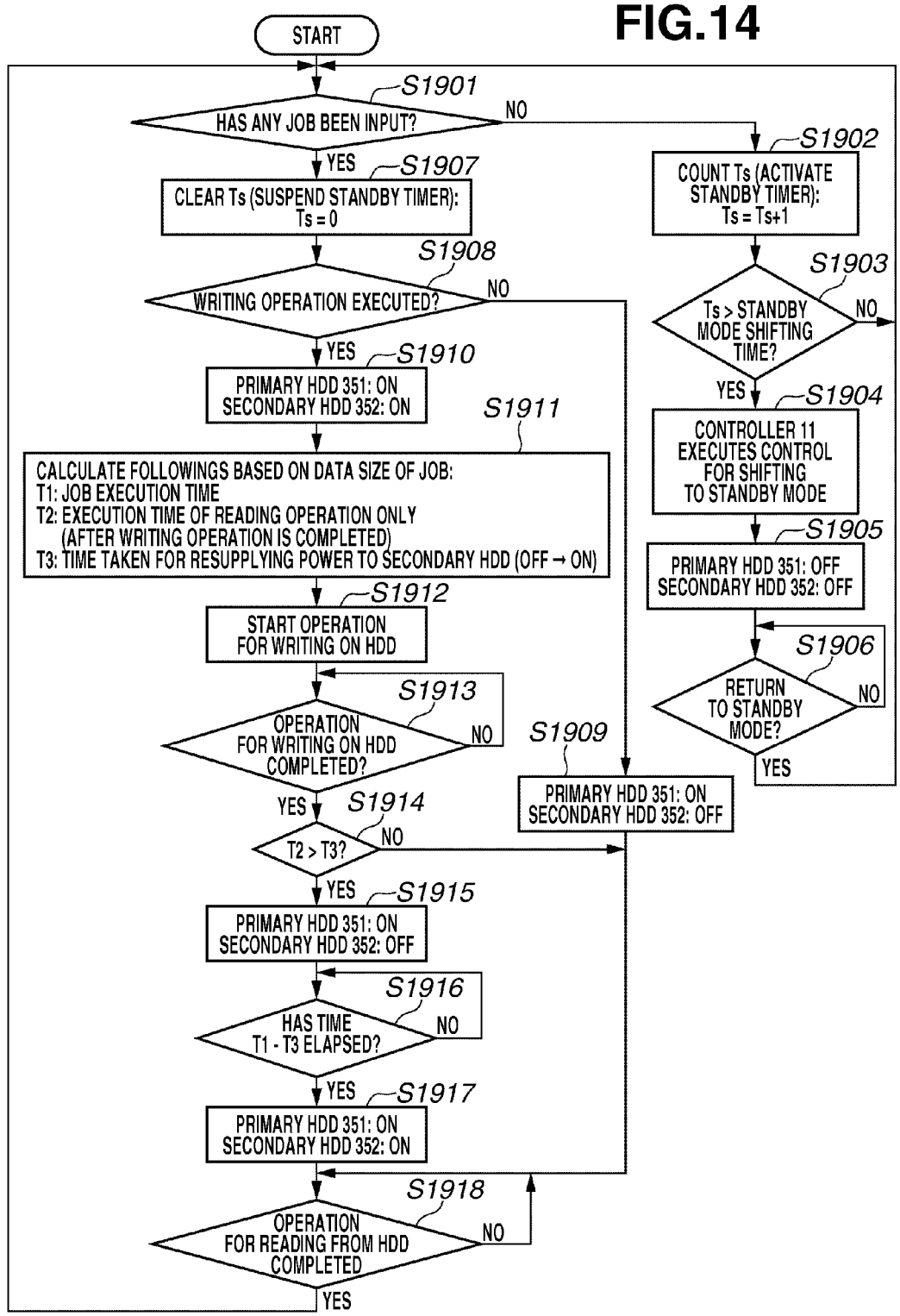
FIG. 14 is a flow chart illustrating exemplary flow of a power saving operation executed by an image forming apparatus according to a second exemplary embodiment of the present invention.

The above-described "operation for storing data in box" and "copy operation" will be described in detail below with reference to FIG. 14. FIG. 14 is a flow chart illustrating an example of the power saving operation executed by the image forming apparatus 10 according to the second exemplary embodiment of the present invention.

In the example illustrated in FIG. 14, processing in steps S1901 through S1918 is implemented by the CPU 301 of the controller 11 of the image forming apparatus 10 by reading and executing a program from the ROM 303.

Referring to FIG. 14, in step S1901, the CPU 301 of the controller 11 of the image forming apparatus 10 determines whether a job has been input after the image forming apparatus 10 is powered on. If it is determined that no job has been input (NO in step S1901), then the processing advances to step S1902. In step S1902, the CPU 301 of the controller 11 of the image forming apparatus 10 activates a counter (Ts) for measuring time taken for shifting to the standby mode and increments Ts by 1 (Ts=Ts+1).

In step S1903, the CPU 301 of the controller 11 of the image processing apparatus 10 determines whether the counter value (Ts) has exceeded a predetermined standby mode-shifting time. If it is determined that the counter value (Ts) has not exceeded a predetermined standby mode-shifting time (NO in step S1903), then the processing returns to step S1901 and waits until a job is input and the counter value (Ts) exceeds the predetermined standby mode-sifting time.

On the other hand, if it is determined that the counter value (Ts) has exceeded a predetermined standby mode-shifting time (YES in step S1903), then the processing advances to step S1904.

In step S1904, the CPU 301 of the controller 11 of the image processing apparatus 10 changes the mode of the image forming apparatus 10 into the standby state. Then, the processing advances to step S1905.

In step S1905, the CPU 301 of the controller 11 of the image processing apparatus 10 releases (switches off) both of the above-described switches 401 and 402 and powers off both of the above-described hard disks 351 and 352. The controller 11 of the image processing apparatus 10 executes control to continue the standby state of the image forming apparatus 10 until the user presses the soft power switch 1201 (FIG. 8) or inputs a page description language (PDL) job from the PC 40 (NO in step S1906).

If it has been designated that the image forming apparatus 10 is to return from the standby state (YES in step S1906), then the CPU 301 of the controller 11 of the image forming apparatus 10 returns to step S1901.

On the other hand, if it is determined that a job has been input (YES in step S1901), then the processing advances to step S1907. In step S1907, the CPU 301 of the controller 11 of the image forming apparatus 10 clears the counter (Ts). Then, the processing advances to step S1908.

In step S1908, the CPU 301 of the controller 11 of the image forming apparatus 10 determines whether the input job includes an operation for writing data on the hard disk. In the present exemplary embodiment, a "job including an operation for writing data on the hard disk" refers to the above-described "operation for storing data on a box" and "copy operation".

If it is determined that the input job does not include an operation for writing data on the hard disk (i.e., if it is determined that the input job is a job that includes an operation for reading data from the hard disk only) (NO in step S1908), then the processing advances to step S1909. In the present exemplary embodiment, an "operation for reading data from the hard disk only" is equivalent to an "operation for reading data from a box".

In step S1909, the CPU 301 of the controller 11 of the image processing apparatus 10 starts the reading operation, switches the power switch 401 ON, and powers on the primary hard disk 351.

In addition, the CPU 301 of the controller 11 of the image processing apparatus 10 switches the power switch 402 OFF, and powers off the secondary hard disk 352. Then, the processing advances to step S1918.

On the other hand, if it is determined that the input job includes the operation for writing data on the hard disk (YES in step S1908), then the processing advances to step S1910. In step S1910, the CPU 301 of the controller 11 of the image processing apparatus 10 switches both of the above-described switches 401 and 402 ON and powers on the hard disks 351 and 352.

In step S1911, the CPU 301 of the controller 11 of the image processing apparatus 10 acquires the following three time lengths (T1 through T3):

T1: job execution time (from the start of the writing operation to the end of the reading operation)

T2: execution time of the reading operation only (processing time taken if the reading operation is executed after the reading operation is completed)

T3: power supply resumption time for supplying power to the secondary hard disk 352 again (time taken from the timing of powering off of the secondary hard disk 352 to the timing at which the data stored on the hard disk becomes accessible after the secondary hard disk 352 is powered on again) (the spin up time of the secondary hard disk 352).

The time T1 and T2 can be calculated based on the data size and the content of the input job. Furthermore, the time T3 can be obtained as a specification of the hard disk actually mounted or can be obtained by an actual measurement on the image forming apparatus 10. The time T3 is previously stored on the image forming apparatus 10.

In step S1912, the CPU 301 of the controller 11 of the image processing apparatus 10 starts an operation for writing data of the input job on the hard disks 351 and 352.

In step S1913, the CPU 301 of the controller 11 of the image forming apparatus 10 waits until the operation for writing the data of the job on the hard disk is completed (determines whether the operation for writing the data of the job on the hard disk is completed). If it is determined that the operation for writing the data of the job on the hard disk is completed (YES in step S1913), then the processing advances to step S1914.

In step S1914, the CPU 301 of the controller 11 of the image processing apparatus 10 starts the reading operation and compares the time T2 and the time T3 calculated in step S1911.

If it is determined that the time T2 is equal to or less than T3 (T2≦T3) (NO in step S1914), then the processing advances to step S1918 without executing control of the power source unit.

In step S1918, the CPU 301 of the controller 11 of the image forming apparatus 10 waits until the operation for reading data from the hard disk is completed. More specifically, in step S1918, the CPU 301 of the controller 11 of the image forming apparatus 10 determines whether the operation for reading data from the hard disk is completed. If it is determined that the operation for reading data from the hard disk is completed (YES in step S1918), then the processing returns to step S1901 and determines whether a new job is to be input.

As described above, if the reading operation estimated processing time is shorter than the spin up time of the secondary hard disk 352, then the present exemplary embodiment does not power off the secondary hard disk 352. Accordingly, the present exemplary embodiment can execute the writing operation for a subsequent job immediately after the reading operation is completed. With this configuration, the present exemplary embodiment can reduce the power consumption while reducing the influence on the performance of the image forming apparatus 10.

On the other hand, if it is determined that the time T2 is greater than the time T3 (T2>T3) (YES in step S1914), then the processing advances to step S1915.

It is determined "YES" in step S1914 if it is determined that the "specific state", in which the reading operation only is executed (in other words, if the primary hard disk 351 is used but the secondary hard disk 352 is not used), continues for a time length longer than the spin up time of the secondary hard disk 352.

In step S1915, the CPU 301 of the controller 11 of the image forming apparatus 10 switches off the power switch 402 only and powers off the secondary hard disk 352.

The CPU 301 of the controller 11 of the image processing apparatus 10 starts counting the time after starting the operation for writing data on the hard disk. More specifically, in step S1916, the CPU 301 of the controller 11 of the image forming apparatus 10 waits until the time T1−T3 elapse after the start of the operation for writing data on the hard disk. In other words, the CPU 301 of the controller 11 of the image forming apparatus 10 determines whether the time T1-T3 has elapsed after the start of the operation for writing data on the hard disk.

If it is determined that the time T1-T3 has elapsed after the start of the operation for writing data on the hard disk (YES in step S1916), then the processing advances to step S1917.

However, the present exemplary embodiment is not limited to this. More specifically, it is also useful if the CPU 301 of the controller 11 of the image forming apparatus 10 counts the time after starting the operation for reading data from the hard disk. In this case, the CPU 301 of the controller 11 of the image forming apparatus 10 waits until the time T2 and T3 elapse after starting the operation for reading data from the hard disk. In this case, in step S1916, the CPU 301 of the controller 11 of the image forming apparatus 10 can determine whether the time T2−T3 has elapsed.

In step S1917, the CPU 301 of the controller 11 of the image processing apparatus 10 switches the power switch 402 ON and powers on the secondary hard disk 352. Then, the processing advances to step S1918.

More specifically, in step S1917, the CPU 301 executes control so that the power supply to the secondary hard disk 352 is resumed at a timing (YES in step S1916) earlier by T3 (the spin up time of the secondary hard disk 352) than the timing of completion of reading the data from the primary hard disk 351 after the power supply to the secondary hard disk 352 is discontinued (step S1915).

In step S1918, the CPU 301 of the controller 11 of the image forming apparatus 10 waits until the operation for reading data from the hard disk is completed. If it is determined that the operation for reading data from the hard disk is completed (YES in step S1918), then the processing returns to step S1901 and determines whether a new job is input.

As described above, the present exemplary embodiment powers on the secondary hard disk 352 at the timing earlier than the timing at which the reading operation is estimated to be completed, by the length of time equivalent to the spin up time for the secondary hard disk 352. Accordingly, the present exemplary embodiment can start the operation for writing data on the hard disk of a new job immediately after the reading operation is completed. With the above-described configuration, the present exemplary embodiment can reduce the power consumption while suppressing the influence on the performance of the image forming apparatus 10 to a minimum.

Thus, in the "operation for storing data on the hard disk" and "copy operation" described above, the present exemplary embodiment having the configuration described above can reduce the power consumption of the image forming apparatus 10 while reducing the influence on the performance of the image forming apparatus 10 by restricting the power supply to the hard disk that is not used during the reading operation, based on a lead time calculated based on the data size of the job and based on the spin up time of the secondary hard disk 352.

In the above-described flow chart, it is also useful, when it is determined "normal" in step S1908, if the CPU 301 of the controller 11 of the image forming apparatus 10 executes processing for acquiring the three time lengths T1, T2 and T3 (step S1911) and then the processing advances to step S1914.

In addition, the condition "T2>T3" in step S1914 can be substituted with a condition "T2>T3+α". In this case, an adjustment value "α" has a predetermined positive numerical value.

By using the above-described adjustment value α, the present exemplary embodiment can use a very strict condition for powering off the secondary hard disk 352. With the above-described configuration, the present exemplary embodiment can effectively reduce the influence on the performance of the image forming apparatus 10, which may arise by powering off the secondary hard disk 352.

In addition, in the second exemplary embodiment, if the time T2 (execution time taken if only the reading operation is executed) is longer than the time T3 (the time taken for resuming the power supply to the secondary hard disk 352), the CPU 301 powers off the secondary hard disk 352. However, the present exemplary embodiment is not limited to this.

More specifically, if a first writing operation (first writing processing), a reading operation (reading processing), and a second writing operation (second writing processing) are serially executed, it is also useful if the CPU 301 continues the power supply to the secondary hard disk 352 even after the first writing operation (the first writing processing) is completed.

By performing the above-described processing, it becomes unnecessary to resume the power supply of the secondary hard disk 352 at the start of the second writing operation (the second writing processing).

If the power supply to the secondary hard disk 352 is always ON, the power consumption cannot be reduced. Accordingly, it is also useful that, if a writing operation and a reading operation are serially executed but the writing operation is not executed immediately after the reading operation, then the CPU 301 powers off the secondary hard disk 352 when the writing operation is completed.

Now, a third exemplary embodiment of the present invention will be described in detail below. In the above-described first and second exemplary embodiments, the CPU 301 powers off the hard disk that is not used to reduce the power consumption. Generally, when using a hard disk, if the hard disk is powered off, it is necessary for a user of the apparatus using the hard disk to wait during the spin up time, namely, the time necessarily taken until the speed of rotation of a disk of the hard disk drive reaches a sufficiently high speed.

Therefore, it takes time in resuming the power supply to the secondary hard disk 352 itself. In addition, the power is consumed for resuming the power supply to the secondary hard disk 352. Accordingly, the power consumption may not be effectively reduced.

In the present exemplary embodiment, the CPU 301 executes an operation for reducing the time taken in resuming the power supply to the hard disk and the power consumption of the hard disk by using a power saving mode provided in the hard disk itself.

In the present exemplary embodiment, a "power saving mode" refers to an operation mode of a hard disk, in which the amount of power supplied to a part of circuits of the hard disk is reduced or the frequency of rotation of a spindle motor of the hard disk is reduced. The operation mode of the hard disk can be changed to the power saving mode according to a predetermined command transmitted from the CPU 301 of the controller 11 to the hard disk.

If the power supply to a part of the circuits of the hard disk is to be reduced, several milliseconds of time becomes necessary while if the frequency of rotation of the spindle motor is controlled (reduced), about five to ten seconds of time may become necessary. In either case, the time taken for executing the operation is smaller than the time necessary in spinning up the hard disk (the head of the hard disk moves from a retracted position and the motor of the hard disk starts rotating from the rotation speed of zero) and also the power consumption in either case is less than that consumed in spinning up the hard disk.

With the above-described configuration, the present exemplary embodiment can suppress the influence on the performance of the image forming apparatus 10 by reducing the time taken in starting a writing operation if the writing operation is necessary while reducing the power consumption consumed on the hard disk itself.

The above-described operation can be implemented by substituting the operation for powering off the secondary hard disk 352 in step S1812 in the first exemplary embodiment and in steps S1909 and S1915 in the second exemplary embodiment with the operation for shifting to the power saving mode.

Now, an operation for further reducing the power consumption according to the second exemplary embodiment, which is implemented by switching between an operation for powering off the secondary hard disk 352 and the power saving mode, will be described in detail below with reference to a flow chart of FIG. 15.

Figure 15:
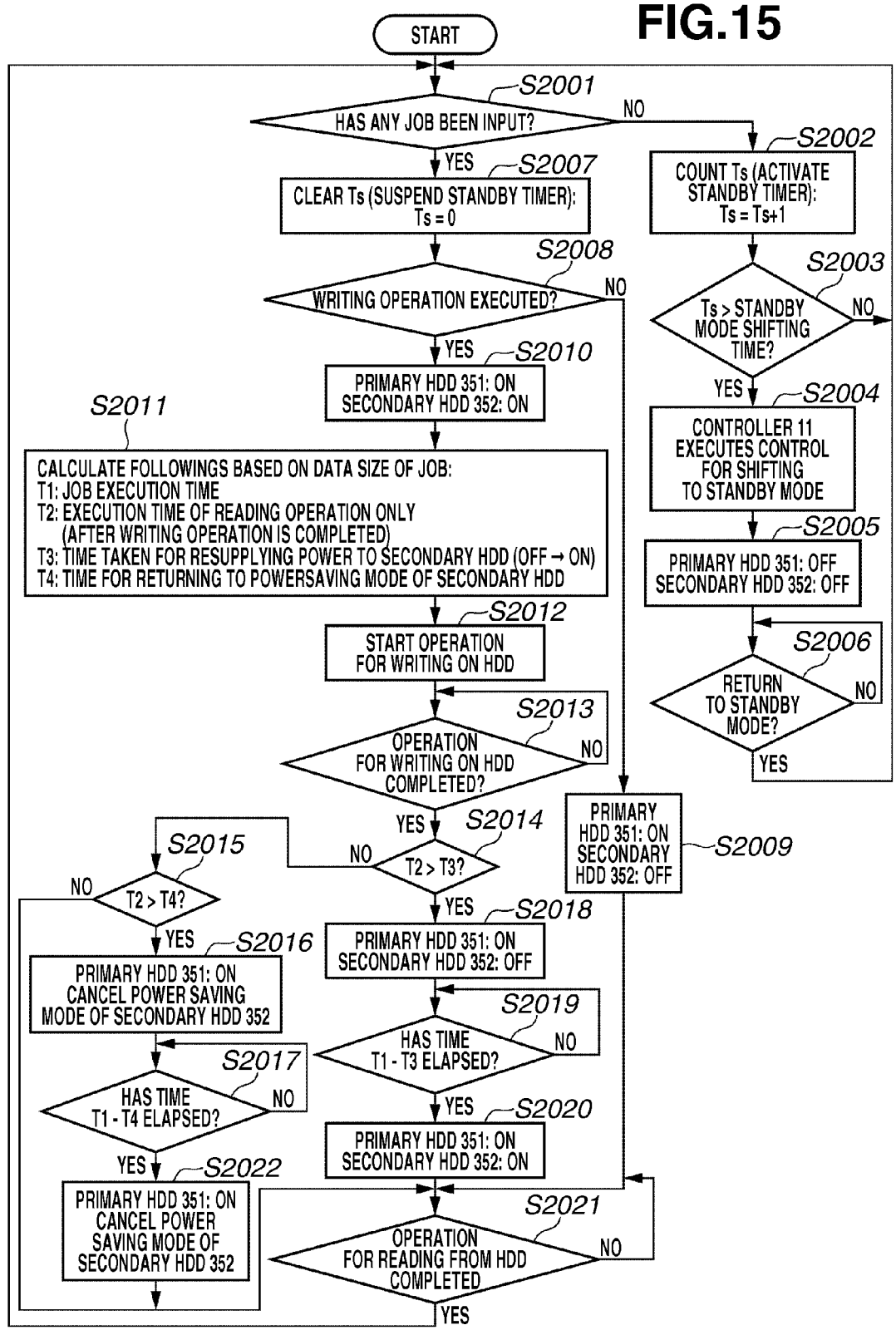
FIG. 15 is a flow chart illustrating exemplary flow of a power saving operation executed by an image forming apparatus according to a third exemplary embodiment of the present invention.

FIG. 15 is a flow chart illustrating exemplary flow of the power saving operation executed by the image forming apparatus 10 according to the third exemplary embodiment of the present invention.

In the example illustrated in FIG. 15, processing in steps S2001 through S2021 is implemented by the CPU 301 of the controller 11 of the image forming apparatus 10 by reading and executing a program from the ROM 303.

Referring to FIG. 15, in step S2001, the CPU 301 of the controller 11 of the image forming apparatus 10 determines whether a job has been input after the image forming apparatus 10 is powered on. If it is determined that no job has been input (NO in step S2001), then the processing advances to step S2002. In step S2002, the CPU 301 of the controller 11 of the image forming apparatus 10 activates a counter (Ts) for measuring time taken for shifting to the standby mode and increments Ts by 1 (Ts=Ts+1).

In step S2003, the CPU 301 of the controller 11 of the image processing apparatus 10 determines whether the counter value (Ts) has exceeded a predetermined standby mode-shifting time. If it is determined that the counter value (Ts) has not exceeded a predetermined standby mode-shifting time (NO in step S2003), then the processing returns to step S2001 and waits until a job is input and the counter value (Ts) exceeds the predetermined standby mode-sifting time.

On the other hand, if it is determined that the counter value (Ts) has exceeded a predetermined standby mode-shifting time (YES in step S2003), then the processing advances to step S2004.

In step S2004, the CPU 301 of the controller 11 of the image processing apparatus 10 changes the mode of the image forming apparatus 10 to the standby state. Then, the processing advances to step S2005.

In step S2005, the CPU 301 of the controller 11 of the image processing apparatus 10 releases (switches off) both of the above-described switches 401 and 402 and powers off both of the above-described hard disks 351 and 352. The controller 11 of the image processing apparatus 10 executes control to continue the standby state of the image forming apparatus 10 until the user presses the soft power switch 1201 (FIG. 4) or inputs a page description language (PDL) job from the PC 40 (NO in step S2006).

If it has been designated that the image forming apparatus 10 is to return from the standby state (YES in step S2006), then the CPU 301 of the controller 11 of the image forming apparatus 10 returns to step S2001.

On the other hand, if it is determined that a job has been input (YES in step S2001), then the processing advances to step S2007. In step S2007, the CPU 301 of the controller 11 of the image forming apparatus 10 clears the counter (Ts). Then, the processing advances to step S2008.

In step S2008, the CPU 301 of the controller 11 of the image forming apparatus 10 determines whether the input job includes an operation for writing data on the hard disk. In the present exemplary embodiment, a "job including an operation for writing data on the hard disk" refers to the above-described "operation for storing data on a box" and "copy operation".

If it is determined that the input job does not include an operation for writing data on the hard disk (i.e., if it is determined that the input job is a job that includes an operation for reading data from the hard disk only) (NO in step S2008), then the processing advances to step S2009. In the present exemplary embodiment, an "operation for reading data from the hard disk only" is equivalent to an "operation for reading data from a box".

In step S2009, the CPU 301 of the controller 11 of the image processing apparatus 10 starts the reading operation, switches the power switch 401 ON, and powers on the primary hard disk 351.

In addition, the CPU 301 of the controller 11 of the image processing apparatus 10 switches the power switch 402 OFF, and powers off the secondary hard disk 352. Then, the processing advances to step S2021.

On the other hand, if it is determined that the input job includes the operation for writing data on the hard disk (YES in step S2008), then the processing advances to step S2010. In step S2010, the CPU 301 of the controller 11 of the image processing apparatus 10 switches both of the above-described switches 401 and 402 ON and powers on the hard disks 351 and 352.

In step S2011, the CPU 301 of the controller 11 of the image processing apparatus 10 acquires the following four time lengths (T1 through T4):

T1: job execution time (from the start of the writing operation to the end of the reading operation)

T2: execution time of the reading operation only (processing time taken if the reading operation is executed after the reading operation is completed)

T3: power supply resumption time for supplying power to the secondary hard disk 352 again (time taken from the timing of powering off of the secondary hard disk 352 to the timing at which the data stored on the hard disk becomes accessible after the secondary hard disk 352 is powered on again) (the spin up time of the secondary hard disk 352) (a first power supply resumption time).

T4: the time taken for resuming the power supply to the secondary hard disk 352 from the power saving mode (the time taken until the data stored on the secondary hard disk 352 becomes accessible after the power saving mode is released) i.e., the restart time of the secondary hard disk 352 from the power saving mode (a second power supply resumption time).

The time T1 and T2 can be calculated based on the data size and the content of the input job. Furthermore, the time T3 can be obtained from a specification of the hard disk to be actually mounted or can be obtained by an actual measurement in the image forming apparatus 10.

The time T3 is previously stored on the image forming apparatus 10. The time T4 is also previously stored on the image forming apparatus 10. Generally, the time T4 is shorter than the time T3. Also, in the present exemplary embodiment, T4<T3.

In step S2012, the CPU 301 of the controller 11 of the image processing apparatus 10 starts an operation for writing data of the input job on the hard disks 351 and 352.

In step S2013, the CPU 301 of the controller 11 of the image forming apparatus 10 waits until the operation for writing the data of the job on the hard disk is completed (d the CPU 301 waits until the operation for writing the data of the job on the hard disk is completed). If it is determined that the operation for writing the data of the job on the hard disk is completed (YES in step S2013), then the processing advances to step S2014.

In step S2014, the CPU 301 of the controller 11 of the image processing apparatus 10 starts the reading operation and compares the time T2 and the time T3 calculated in step S2011.

If it is determined that the time T2 is greater than T3 (T2>T3) (NO in step S2014), then the processing advances to step S2018.

It is determined "YES" in step S2014 if the "specific state", in which only the reading operation is executed (in other words, if the primary hard disk 351 is used but the secondary hard disk 352 is not used), continues for a time length longer than the spin up time of the secondary hard disk 352 (a first determination).

In step S2018, the CPU 301 of the controller 11 of the image forming apparatus 10 switches off the power switch 402 only and powers off the secondary hard disk 352.

In step S2019, the CPU 301 of the controller 11 of the image forming apparatus 10 waits until the time T1−T3 elapses after the start of the operation for writing data on the hard disk (in other words, the CPU 301 of the controller 11 of the image forming apparatus 10 determines whether the time T1−T3 has elapsed after the start of the operation for writing data on the hard disk).

If it is determined that the time T1−T3 has elapsed after the start of the operation for writing data on the hard disk (YES in step S2019), then the processing advances to step S2020.

However, the present exemplary embodiment is not limited to this. More specifically, it is also useful if the CPU 301 of the controller 11 of the image forming apparatus 10 counts the time after starting the operation for reading data from the hard disk. In this case, the CPU 301 of the controller 11 of the image forming apparatus 10 waits until the time T2−T3 elapses after starting the operation for reading data from the hard disk. In other words, in step S2019, the CPU 301 of the controller 11 of the image forming apparatus 10 may make a determination based on whether the time T2−T3 has elapsed.

In step S2020, the CPU 301 of the controller 11 of the image processing apparatus 10 switches the power switch 402 ON and powers on the secondary hard disk 352. Then, the processing advances to step S2021.

More specifically, in step S2020, the CPU 301 executes control so that the power supply to the secondary hard disk 352 is resumed at a timing (the timing used if it is determined "YES" in step S2019) earlier than the timing of completion of the operation for reading data from the primary hard disk 351 after the power supply to the secondary hard disk 352 is discontinued (step S2018), by the length of time equivalent to the time T3 (the spin up time of the secondary hard disk 352). Then, the processing advances to step S2021.

On the other hand, if it is determined that the time T2 is equal to or less than T3 (T2≦T3) (NO in step S2014), then the processing advances to step S2015.

In step S2015, the CPU 301 of the controller 11 of the image processing apparatus 10 compares the time T2 and the time T4 calculated in step S2011.

If it is determined that the time T2 is equal to or less than T4 (T2≦T4) (NO in step S2015), then the processing advances to step S2021 without executing control of the power source unit.

In step S2021, the CPU 301 of the controller 11 of the image forming apparatus 10 waits until the operation for reading data from the hard disk is completed. More specifically, in step S2021, the CPU 301 of the controller 11 of the image forming apparatus 10 determines whether the operation for reading data from the hard disk is completed. If it is determined that the operation for reading data from the hard disk is completed (YES in step S2021), then the processing returns to step S2001 and determines whether a new job is input.

On the other hand, if it is determined that the time T2 is greater than the time T4 (T2>T4) (YES in step S2015), then the processing advances to step S2016.

It is determined "YES" in step S2015 if the "specific state", in which only the reading operation is executed (in other words, if the primary hard disk 351 is used but the secondary hard disk 352 is not used), continues for a time length shorter than the spin up time of the secondary hard disk 352 (shorter than the first power supply resumption time) but longer than the time taken for resuming the power supply to the secondary hard disk 352 from the power saving mode (longer than the second power supply resumption time) (a second determination).

In step S2016, the CPU 301 of the controller 11 of the image processing apparatus 10 changes the operation mode of the secondary hard disk 352 to the power saving mode.

The CPU 301 of the controller 11 of the image processing apparatus 10 starts counting the time after starting the operation for writing data on the hard disk. More specifically, in step S2017, the CPU 301 of the controller 11 of the image forming apparatus 10 waits until the time T1–T4 elapses after the start of the operation for writing data on the hard disk. In other words, the CPU 301 of the controller 11 of the image forming apparatus 10 determines whether the time T1–T4 has elapsed after the start of the operation for writing data on the hard disk.

If it is determined that the time T1–T4 has elapsed after the start of the operation for writing data on the hard disk (YES in step S2017), then the processing advances to step S2022.

However, the present exemplary embodiment is not limited to this. More specifically, it is also useful if the CPU 301 of the controller 11 of the image forming apparatus 10 counts the time after starting the operation for reading data from the hard disk. In this case, the CPU 301 of the controller 11 of the image forming apparatus 10 waits until the time T2–T4 elapses after starting the operation for reading data from the hard disk. In this case, in step S2017, the CPU 301 of the controller 11 of the image forming apparatus 10 can determine whether the time T2–T4 has elapsed.

In step S2022, the CPU 301 of the controller 11 of the image processing apparatus 10 releases the operation mode of the secondary hard disk 352 from the power saving mode. Then, the processing advances to step S2021.

More specifically, after the operation mode of the secondary hard disk 352 is changed to the power saving mode (step S2016), in step S2022, the CPU 301 executes control so that the power supply to the secondary hard disk 352 is resumed after releasing the power saving mode at the timing earlier than the timing at which the reading operation for reading data from the primary hard disk 351 is completed (the timing used if it is determined "YES" in step S2017) by the length of time equivalent to the time T4 (the time taken for resuming the power supply to the secondary hard disk 352 from the power saving mode thereof). Then, the processing advances to step S2021.

In step S2021, the CPU 301 of the controller 11 of the image forming apparatus 10 determines whether the operation for reading data from the hard disk is completed. If it is determined that the operation for reading data from the hard disk is completed (YES in step S2021), then the processing returns to step S2001 and determines whether a new job is input.

As described above, the present third embodiment can change the operation mode of the secondary hard disk 352, to which power is continuously supplied in the second exemplary embodiment described above, to the power saving mode.

With the above-described configuration, the present exemplary embodiment can further reduce the power consumption of the image forming apparatus 10 and also reduce the influence on the performance of the image forming apparatus 10.

It is also useful, in executing the processing in the above-described flow chart, if it is determined "NO" in step S2008, then the CPU 301 executes processing for acquiring the four time lengths (T1, T2, T3, and T4) used in step S2011. In this case, the processing advances to step S2014.

FIG. 15 is a flow chart illustrating the following two control operations executed by the image forming apparatus according to the present exemplary embodiment.

In a first control, if T2>T3, the CPU 301 executes control to supply power to the primary hard disk 351 while discontinuing the power supply to the secondary hard disk 352. In addition, in the first control according to the present exemplary embodiment, the CPU 301 executes control to resume the power supply to the secondary hard disk 352 at the timing earlier than the timing at which the reading operation is completed, by the time length equivalent to the spin up time of the secondary hard disk 352 (more specifically, the timing at which it is determined that the time T1–T3 has elapsed).

In a second control according to the present exemplary embodiment, if it is determined that $T3 \leq T2 > T4$, then the CPU 301 executes control to keep supplying the power to the hard disks 351 and 352 while changing the operation mode of the secondary hard disk 352 to the power saving mode. In addition, the CPU 301 releases the operation mode of the secondary hard disk 352 from the power saving mode and resumes the power supply to the secondary hard disk 352 at the timing earlier than the timing at which the reading operation is completed, by the length of time equivalent to the time taken for resuming the power supply to the secondary hard disk 352 after releasing the operation mode of the secondary hard disk 352 from the power saving mode (more specifically, the timing at which it is determined that the time T1-T4 has elapsed).

However, the present invention is not limited to this. More specifically, it is also useful if it is determined that T2>T4, then the CPU 301 executes control to keep supplying the power to the hard disks 351 and 352 while changing the operation mode of the secondary hard disk 352 to the power saving mode and releasing the operation mode of the secondary hard disk 352 from the power saving mode and resumes the power supply to the secondary hard disk 352 at the timing earlier than the timing at which the reading operation is completed, by the length of time equivalent to the time taken for resuming the power supply to the secondary hard disk 352 after changing the operation mode of the secondary hard disk 352 from the power saving mode (more specifically, the timing at which it is determined that the time T1-T4 has elapsed).

In other words, it is also useful that if it is determined "YES" in step S2013 (FIG. 15), then the processing advances to step S2015 and the processing in step S2014 and steps S2018 and S2019 illustrated in FIG. 15 is omitted. In addition, it is also useful if the determination in step S2014 (whether T2>T3) is executed on the basis of whether T2>T3+ $\alpha$.

Furthermore, it is also useful if the determination in step S2015 (whether T2>T4) is executed on the basis of whether T2>T4+$\beta$. In these cases, the adjustment values $\alpha$ and $\beta$ have a predetermined positive numerical value.

By using the above-described adjustment values $\alpha$ and $\beta$, the present exemplary embodiment can use a very strict condition for powering off the secondary hard disk 352 and for changing the operation mode of the secondary hard disk 352 to the power saving mode.

With the above-described configuration, the present exemplary embodiment can further effectively reduce the influence on the performance of the image forming apparatus 10, which may arise when the secondary hard disk 352 is powered off or when the operation mode of the secondary hard disk 352 is changed to the power saving mode.

In another embodiment 1 of the present invention, the CPU 301 of the controller 11 of the image forming apparatus 10 determines whether an operation state of the image forming apparatus 10 has changed to a state in which both of the above-described hard disks 351 and 352 are not used. More specifically, in the present exemplary embodiment, the CPU 301 of the controller 11 of the image forming apparatus 10 determines whether the image forming apparatus 10 has satisfied a condition for shifting to the power saving mode (operation state determination processing).

If it is determined that an operation state of the image forming apparatus 10 has changed to a state in which both of the above-described hard disks 351 and 352 are not used, then the CPU 301 executes control to discontinue the power supply to all the hard disks (both of the above-described hard disks 351 and 352).

With the above-described configuration, the present another exemplary embodiment can effectively reduce the power consumption of the image processing apparatus 10.

As for the condition for determining whether to change the operation mode of the image forming apparatus 10 to the power saving mode, such a condition whether no access to the image forming apparatus 10 is executed for a predetermined time length (ten minutes, for example) (in other words, whether the image forming apparatus 10 keeps idling for a predetermined length of time) can be used.

In each of the exemplary embodiments of the present invention, the CPU 301 reads data from the primary hard disk 351 only. In another embodiment 2 of the present invention, the CPU 301 executes control to change a source of reading data between the primary hard disk 351 and the secondary hard disk 352. In this case, present another exemplary embodiment can change the data reading source hard disk between the primary hard disk 351 and the secondary hard disk 352 by a predetermined time interval (one hundred hours, for example) or by a predetermined number of times of energizing operations (one thousand times, for example).

More specifically, in this case, the CPU 301 can execute control to change the function of the primary hard disk and the secondary hard disk at a predetermined time interval or every time when a predetermined number of energizing operations are executed.

According to another embodiment 2 having the above-described configuration, the primary hard disk 351 and the secondary hard disk 352 can be evenly worn. Accordingly, present another embodiment can effectively extend the life of components of the image forming apparatus 10 and improve the reliability of the image forming apparatus 10.

In the exemplary embodiments described above, two hard disks, namely, the primary hard disk 351 and the secondary hard disk 352, are provided in the image forming apparatus 10. However, the present invention is not limited to this.

More specifically, the mirroring according to the present invention can be implemented by three or more hard disk drives. In this case, the present invention can be implemented by one primary hard disk 351, from which data is to be read, and the other hard disks, each of which operates in the same manner as the secondary hard disk 352 described above.

With the above-described configuration, the present another exemplary embodiment can improve the reliability of the image forming apparatus 10.

In the above-described first and second exemplary embodiments, the CPU 301 powers off the hard disk that is not used in order to reduce the power consumption. However, the present exemplary embodiment is not limited to this.

More specifically, it is also useful if the CPU 301 changes the operation mode of the hard disk that is not used, to the power saving mode (the mode for reducing the power consumption) described above in the third exemplary embodiment instead of powering off the same.

As described above, in the present invention, in executing a copy operation or a printing operation in the image forming apparatus 10, the CPU 301 of the controller 11 of the image forming apparatus 10 executes control to supply power only to a minimum necessary storage medium according to the operation state of the image forming apparatus 10 instead of always supplying power to the storage medium used in the mirroring operation.

With the above-described configuration, each exemplary embodiment of the present invention can effectively reduce the power consumption and suppress the influence on the performance of the image forming apparatus 10.

As described above, in the present invention, the CPU 301 of the controller 11 executes control to supply power only to a minimum necessary storage medium according to the operation state of the image forming apparatus 10 instead of always supplying power to the storage medium used in the mirroring operation (a storage medium such as a hard disk).

According to exemplary embodiments of the present invention having the configuration described above, the reliability of a storage medium such as a hard disk used in a mirroring system can be secured or improved. In addition, with the above-described configuration, each exemplary embodiment of the present invention can effectively reduce the power consumption of the image forming apparatus 10 while suppressing the influence on the performance of the image forming apparatus 10.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-331676 filed Dec. 26, 2008, which is hereby incorporated by reference herein in its entirety.

What is claimed is:

1. An information processing apparatus comprising:
   a plurality of storage units;
   a mirroring control unit configured to execute mirroring processing, which includes writing processing for writing same data on each of the plurality of storage units and reading processing for reading data from any one of the plurality of storage units;
   a power control unit configured to independently control supply of power to the plurality of storage units; and a determination unit configured to determine whether a length of processing time taken for the reading at a timing between the first writing processing and the second writing processing is longer than a predetermined time length, wherein the power control unit is configured, when it is determined by the determination unit that the processing time is longer than the predetermined time, to reduce the power supplied to the storage unit from which data is not read in the reading processing after the first writing processing is completed, and the power control unit is configured, when it is determined by the determination unit that the processing time is not longer than the predetermined time, to execute control not to reduce the power supplied to the storage unit from which data is not read in the reading processing after the first writing processing is completed, wherein when the first writing processing, the reading processing, and the second writing processing are serially executed, the power control unit executes control not to reduce supply of power to the storage unit from which data is not read in the reading processing after the first writing processing is completed, and when the writing processing and the reading processing are serially executed but another writing processing is not executed immediately after the reading processing, the power control unit executes control to reduce the power supply to the storage unit from which data is not read in the reading processing when the writing processing is completed.

2. The information processing apparatus according to claim 1, wherein the power control unit is configured, when it is determined by the determination unit that the processing time is longer than the predetermined time, to execute control to discontinue the power supply to the storage unit from which data is not read in the reading processing after the first writing processing is completed, and the power control unit is configured, when it is determined by the determination unit that the processing time is not longer than the predetermined time, to execute control not to discontinue the power supply to the storage unit from which data is not read in the reading processing after the first writing processing is completed, and wherein the predetermined time has a length from resumption of power supply to the storage unit to which the supply of power is discontinued, to a timing at which the data stored on the storage unit becomes accessible.

3. The information processing apparatus according to claim 1, wherein the power control unit is configured, when it is determined by the determination unit that the processing time is longer than the predetermined time, to execute control to change an operation mode of the storage unit from which data is not read in the reading processing after the first writing processing is completed, to a power saving mode for reducing the power supplied thereto, and the power control unit is configured, when it is determined by the determination unit that the processing time is not longer than the predetermined time, to execute control not to change the operation mode of the storage unit from which data is not read in the reading processing after the first writing processing is completed, to the power saving mode, and wherein the predetermined time has a length from a timing at which the storage unit in the power saving mode is released from the power saving mode, to a timing at which the data stored on the storage unit becomes accessible.

4. An information processing apparatus comprising:

a plurality of storage units;

a mirroring control unit configured to execute mirroring processing, which includes writing processing for writing same data on each of the plurality of storage units and reading processing for reading data from any one of the plurality of storage units;

a power control unit configured to independently control supply of power to the plurality of storage units;

a first determination unit configured to determine whether a specific operation state, in which a specific storage unit is used but another storage unit is not used, continues for a length of time longer than a predetermined first power supply resumption time; and a second determination unit configured to determine whether the specific operation state continues for a length of time longer than a predetermined second power supply resumption time, which is equal to or shorter than the first power supply resumption time, wherein the power control unit is configured, when it is determined by the first determination unit that the specific operation state continues for a length of time longer than the first power supply resumption time, to execute control to discontinue supply of power to the another storage unit while supplying power to the specific storage unit and configured to resume the power supply to the another storage unit at a timing earlier than a timing of an end of the specific operation state by a length of time equivalent to the first power supply resumption time, and the power control unit is configured, when it is determined by the second determination unit that the specific operation state continues for a length of time equal to or shorter than the first power supply resumption time but longer than the second power supply resumption time, to execute control to supply power to each of the plurality of storage units, to change the operation mode of the another storage unit to the power saving mode, and to release the operation mode of the another storage unit from the power saving mode at a timing earlier than a timing of an end of the specific operation state by a length of time equivalent to the length of the second power supply resumption time.

5. The information processing apparatus according to claim 4, wherein the predetermined first power supply resumption time has a length from a timing of resumption of the power supply to the storage unit whose power supply has been discontinued, to a timing at which data stored on the storage unit becomes accessible, and wherein the predetermined second power supply resumption time has a length from a timing at which the operation mode of the storage unit is released from the power saving mode, to a timing at which the data stored on the storage unit becomes accessible.

6. A method for controlling an information processing apparatus including a plurality of storage units, a mirroring control unit configured to execute mirroring processing, which includes writing processing for writing same data on each of the plurality of storage units and reading processing for reading data from any one of the plurality of storage units, and a power control unit configured to independently control supply of power to the plurality of storage units, the method comprising:

executing first control, when the first writing processing, the reading processing, and the second writing processing are serially executed, not to reduce supply of power to the storage unit from which data is not read in the reading processing after the first writing processing is completed determining whether a length of processing time taken for the reading at a timing between the first writing processing and the second writing processing is longer than a predetermined time length, if the processing time is longer than the predetermined time, then reducing the power supplied to the storage unit from which data is not read in the reading processing after the first writing processing is completed, and the power control unit is configured, and if the processing time is not longer than the predetermined time, then not reducing the power supplied to the storage unit from which data is not read in the reading processing after the first writing processing is completed; and executing second control, when the writing processing and the reading processing are serially executed but another writing processing is not executed immediately after the reading processing, to reduce the power supply to the storage unit from which data is not read in the reading processing when the writing processing is completed.

7. A method for controlling an information processing apparatus including a plurality of storage units, a mirroring control unit configured to execute mirroring processing, which includes writing processing for writing same data on each of the plurality of storage units and reading processing for reading data from any one of the plurality of storage units, a power control unit configured to independently control supply of power to the plurality of storage units, a first determination unit configured to determine whether a specific operation state, in which a specific storage unit is used but another storage unit is not used, continues for a length of time longer than a predetermined first power supply resumption time, and a second determination unit configured to determine whether the specific operation state continues for a length of time longer than a predetermined second power supply resumption time, which is equal to or shorter than the first power supply resumption time, the method comprising:

executing a first determination, by using the first determination unit, to determine whether a specific operation state, in which a specific storage unit is used but another storage unit is not used, continues for a length of time longer than a predetermined first power supply resumption time;

executing a second determination to determine whether the specific operation state continues for a length of time longer than a predetermined second power supply resumption time, which is equal to or shorter than the first power supply resumption time;

executing control, by using the power control unit, when it is determined in the first determination that the specific operation state continues for a length of time longer than the first power supply resumption time, to discontinue supply of power to the another storage unit while supplying power to the specific storage unit, and to resume the power supply to the another storage unit at a timing earlier than a timing of an end of the specific operation state, by a length of time equivalent to the first power supply resumption time; and executing control of power, when it is determined by the second determination unit that the specific operation state continues for a length of time equal to or shorter than the first power supply resumption time but longer than the second power supply resumption time, while supplying power to the specific storage unit, to change the operation mode of the another storage unit to the power saving mode, and to release the operation mode of the another storage unit from the power saving mode at a timing earlier than a timing of an end of the specific operation state, by a length of time equivalent to the length of the second power supply resumption time.

8. A non-transitory computer readable medium encoded with instructions for controlling an apparatus including a plurality of storage units, a mirroring control unit configured to execute mirroring processing, which includes writing processing for writing same data on each of the plurality of storage units and reading processing for reading data from any one of the plurality of storage units, a power control unit configured to independently control supply of power to the plurality of storage units, a first determination unit configured to determine whether a specific operation state, in which a specific storage unit is used but another storage unit is not used, continues for a length of time longer than a predetermined first power supply resumption time, and a second determination unit configured to determine whether the specific operation state continues for a length of time longer than a predetermined second power supply resumption time, which is equal to or shorter than the first power supply resumption time, comprising:

executing a first determination, to determine whether a specific operation state, in which a specific storage unit is used but another storage unit is not used, continues for a length of time longer than a predetermined first power supply resumption time;

executing a second determination to determine whether the specific operation state continues for a length of time longer than a predetermined second power supply resumption time, which is equal to or shorter than the first power supply resumption time;

executing control, when it is determined in the first determination that the specific operation state continues for a length of time longer than the first power supply resumption time, to discontinue supply of power to the another storage unit while supplying power to the specific storage unit, and to resume the power supply to the another storage unit at a timing earlier than a timing of an end of the specific operation state, by a length of time equivalent to the first power supply resumption time; and executing control of power, when it is determined that the specific operation state continues for a length of time equal to or shorter than the first power supply resumption time but longer than the second power supply resumption time, while supplying power to the specific storage unit, to change the operation mode of the another storage unit to the power saving mode, and to release the operation mode of the another storage unit from the power saving mode at a timing earlier than a timing of an end of the specific operation state, by a length of time equivalent to the length of the second power supply resumption time.

9. A non-transitory computer readable medium encoded with instructions for controlling an apparatus including a plurality of storage units, a mirroring control unit configured to execute mirroring processing, which includes writing processing for writing same data on each of the plurality of storage units and reading processing for reading data from any one of the plurality of storage units, and a power control unit configured to independently control supply of power to the plurality of storage units comprising:

executing first control, when the first writing processing, the reading processing, and the second writing processing are serially executed, not to reduce supply of power to the storage unit from which data is not read in the reading processing after the first writing processing is completed determining whether a length of processing time taken for the reading at a timing between the first writing processing and the second writing processing is longer than a predetermined time length, if the processing time is longer than the predetermined time, then reducing the power supplied to the storage unit from which data is not read in the reading processing after the first writing processing is completed, and the power control unit is configured, and if the processing time is not longer than the predetermined time, then not reducing the power supplied to the storage unit from which data is not read in the reading processing after the first writing processing is completed; and executing second control, when the writing processing and the reading processing are serially executed but another writing processing is not executed immediately after the reading processing, to reduce the power supply to the storage unit from which data is not read in the reading processing when the writing processing is completed.

* * * * *